United States Patent
Sogo et al.

(10) Patent No.: US 7,674,506 B2
(45) Date of Patent: Mar. 9, 2010

(54) DIRECT BACK LIGHT TYPE LIQUID CRYSTAL DISPLAY AND LIGHT DIFFUSE PLATE

(75) Inventors: Isao Sogo, Chiyoda-ku (JP); Masato Ando, Chiyoda-ku (JP); Mitsuhiro Takeo, Chiyoda-ku (JP); Koji Maeda, Chiyoda-ku (JP); Masanao Jinno, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 126 days.

(21) Appl. No.: 10/559,818

(22) PCT Filed: Jun. 16, 2004

(86) PCT No.: PCT/JP2004/008766

§ 371 (c)(1),
(2), (4) Date: Jan. 18, 2006

(87) PCT Pub. No.: WO2004/111692

PCT Pub. Date: Dec. 23, 2004

(65) Prior Publication Data
US 2006/0146228 A1    Jul. 6, 2006

(30) Foreign Application Priority Data

Jun. 17, 2003   (JP)   ............... 2003-171774

(51) Int. Cl.
*G02F 1/1335*   (2006.01)
(52) U.S. Cl. .......... 428/1.1; 428/1.3; 428/323; 428/327; 428/332; 349/64; 359/599
(58) Field of Classification Search .......... 428/1.1, 428/1.3, 1.33, 221, 323, 327, 332; 106/287.29; 349/64; 359/599
See application file for complete search history.

(56) References Cited

U.S. PATENT DOCUMENTS 4,611,017 A * 9/1986 McKinney et al. .......... 524/119
(Continued)

FOREIGN PATENT DOCUMENTS

EP    0 926 179    6/1999
(Continued)

OTHER PUBLICATIONS

JPO Website English Machine Translation of JP 2001-323149, Mitsunaga, Nov. 20, 2001.*

(Continued)

*Primary Examiner*—Sophie Hon
(74) *Attorney, Agent, or Firm*—Wenderoth, Lind & Ponack, LLP.

(57) ABSTRACT

There is provided a direct backlight type liquid crystal display device having high light diffusability, keeping excellent color and having high brightness.

The direct backlight type liquid crystal display device comprises:
a backlight source,
a light diffusion sheet which may have a protective film on a surface thereof which faces the backlight source or both surfaces thereof as desired,
a light ray adjusting film, and
a liquid crystal panel,
wherein
the light diffusion sheet is formed from a composition comprising predetermined amounts of (C) at least one heat stabilizer (component C) selected from the group consisting of a phosphate compound (component C-1), a phosphate compound (component C-2) and a phosphonite compound (component C-3), (D) an ultraviolet absorber (component D) and (E) a fluorescent whitening agent (component E), based on 100 parts by weight of the total of (A) an aromatic polycarbonate resin (component A) and (B) polymeric fine particles (component B) having an average particle diameter of 0.01 to 50 μm.

28 Claims, 2 Drawing Sheets

U.S. PATENT DOCUMENTS

| | | | | |
|---|---|---|---|---|
| 4,722,955 A | * | 2/1988 | Dick | 524/109 |
| 5,362,783 A | | 11/1994 | Eiffler et al. | |
| 7,314,652 B2 | * | 1/2008 | Hay et al. | 428/1.1 |
| 2002/0161075 A1 | * | 10/2002 | Sassi | 524/99 |
| 2003/0098840 A1 | | 5/2003 | Nagatani | |
| 2003/0156238 A1 | * | 8/2003 | Hiraishi et al. | 349/112 |

FOREIGN PATENT DOCUMENTS

| | | | |
|---|---|---|---|
| JP | 5-477 | | 1/1993 |
| JP | 6-32973 | | 2/1994 |
| JP | 7-138464 | | 5/1995 |
| JP | 7-149995 | | 6/1995 |
| JP | 9-96705 | | 4/1997 |
| JP | 9-281309 | | 10/1997 |
| JP | 10-046018 | | 2/1998 |
| JP | 11-326610 | | 11/1999 |
| JP | 2000-338895 | | 12/2000 |
| JP | 2001031752 A | * | 2/2001 |
| JP | 2001-133604 | | 5/2001 |
| JP | 2001-214049 | | 8/2001 |
| JP | 2001-323149 | | 11/2001 |
| JP | 2001323149 A | * | 11/2001 |
| WO | WO 02/099474 A1 | * | 12/2002 |

OTHER PUBLICATIONS

Supplementary European Search Report issued Sep. 1, 2008 in connection with Application No. EP 04 74 6235.

Japanese Office Action (with English translation) issued Jun. 10, 2009 in counterpart Japanese Application No. 2005-507020.

* cited by examiner

DIRECT BACK LIGHT TYPE LIQUID CRYSTAL DISPLAY AND LIGHT DIFFUSE PLATE

TECHNICAL FIELD

The present invention relates to a light diffusion sheet for a direct backlight formed from a polycarbonate resin composition which has its discoloration in a molten state inhibited, retains excellent color even when exposed to heat and light and has its brightness improved by optimizing a heat stabilizer to be used and minimizing light absorption, and to a liquid crystal display device using the light diffusion sheet.

BACKGROUND ART

As a light diffusion sheet that is a constituent of a backlight unit used as a light source for various liquid crystal display devices such as a liquid crystal television, a light diffusion sheet formed from a resin composition prepared by adding a light diffusing agent to a matrix resin such as an acrylic resin or a polycarbonate resin is used.

For liquid crystal display devices such as liquid crystal televisions whose size has been increasing to 15 to 39 inches in recent years, a direct backlight system has been becoming mainstream along with an increase in area.

A light diffusion sheet made of acrylic resin has high moisture absorbability and low heat resistance and is therefore susceptible to the influence of an increase in size. Hence, when the light diffusion sheet made of acrylic resin is applied to this application, the warpage of the light diffusion sheet is liable to become great due to a change in use environment conditions. Accordingly, there occurs a serious problem that the light diffusion sheet makes contact with a liquid crystal board.

Meanwhile, a light diffusion sheet made of polycarbonate resin has excellent moisture absorbability, heat resistance, mechanical properties and weather resistance and high light transmittance. Thus, it is suitably applied to the application.

A light diffusing agent which is generally used for a polycarbonate resin is organic particles having a cross-lined structure. More specifically, cross-linked acryl particles and cross-linked silicon particles are suitably used from the viewpoint of a difference in refractive index between the particles and the polycarbonate resin.

One of the most important characteristics of light diffusion sheets used in a liquid crystal backlight application is brightness. Brightness is lightness which we sense visually and is considered as a correlation between the intensity of light and color (whiteness). Thus, brightness is lowered by a decrease in the amount of transmitted light caused by light absorption within the light diffusion sheet. Further, brightness is also lowered by yellowing of the light diffusion sheet. The polycarbonate rein is inferior to an acrylic resin in terms of brightness. Hence, an improvement in the brightness of the polycarbonate resin is desired.

As is generally known, the polycarbonate resin is liable to be yellowed by being subjected to a heat history in its production process (such as a reaction, powderization, drying or pelletization). Further, due to a light diffusing agent which is added to exhibit light diffusibility, the light diffusing agent itself undergoes yellowing at the time of molding or induces yellowing of the matrix resin.

A number of methods for improving the heat stability of a polycarbonate resin composition which contains a light diffusing agent are disclosed. For example, Patent Publication 1 describes that adding a phosphine compound and a hindered phenol based antioxidant to a polycarbonate resin prevents yellowing of the polycarbonate resin even when an organic light diffusing agent is used.

Patent Publication 2 describes use of an organic phosphite compound or hindered phenol as a stabilizer for a polycarbonate resin containing a light diffusing agent.

Further, Patent Publication 3 describes that a composition obtained by adding a phosphonate compound, trimethyl phosphate and hindered phenol to a polycarbonate resin containing a light diffusing agent undergoes inhibited discoloration caused by heat or moisture.

Further, Patent Publication 4 describes that a composition obtained by adding a phosphonate compound, trialkyl phosphate, pentaerythritol diphosphite and hindered phenol to a polycarbonate resin containing a light diffusing agent undergoes inhibited discoloration caused by heat.

However, the above polycarbonate resin compositions described in Patent Publications 1 to 4 are basically arts achieved solely from the viewpoint of prevention of discoloration of polycarbonate resin. Accordingly, although they have an effect of preventing discoloration, addition of various stabilizers and additives results in an increase in light absorbing species, so that they cause a decrease in the amount of transmitted light when used as a light diffusion sheet.

As for a method for improving brightness, light absorption in the light diffusion sheet must be suppressed, and discoloration such as yellowing must be inhibited as described above. That is, a light diffusion sheet for a direct backlight which has its brightness further improved by prevention of discoloration and suppression of light absorption is demanded.

(Patent Publication 1) JP-A 07-138464 (the term "JP-A" as used herein means an "unexamined published Japanese patent application")

(Patent Publication 2) JP-A 07-149995

(Patent Publication 3) JP-A 2001-214049

(Patent Publication 4) JP-A 2001-323149

DISCLOSURE OF THE INVENTION

An object of the present invention is to provide a light diffusion sheet for a direct backlight which has high light diffusibility, shows suppressed discoloration, retains excellent color even if exposed to heat and light and has high brightness comparable to that of an acrylic resin. Another object of the present invention is to provide a direct backlight type liquid crystal display device comprising the light diffusion sheet.

The present inventors have made intensive studies to achieve the above objects. As a result, he has found a resin composition obtained by mixing specific amounts of (C) a heat stabilizer, (D) an ultraviolet absorber and (E) a fluorescent whitening agent into a composition comprising (A) an aromatic polycarbonate resin and (B) polymeric fine particles.

The present inventors have found that the discoloration of the polycarbonate resin composition in a molten state is inhibited and that the resin composition can retain excellent color even when exposed to heat and light and minimize light absorption.

Further, the present inventors have found that a light diffusion sheet for a backlight which comprises the resin composition shows improved brightness. The present invention has been completed based on these findings.

That is, the present invention attains the above effects by optimizing the kinds and amounts of the heat stabilizer, ultraviolet absorber and fluorescent whitening agent to be contained in the composition comprising the aromatic polycarbonate resin and the polymeric fine particles. Although what causes the above effects has not yet been specified, it is assumed as follows. That is, it is assumed that when a composition obtained by adding various polymeric fine particles to an aromatic polycarbonate resin is subjected to melt molding or a heat load such as heat from a light source for a long period of time, deterioration ascribable to the thermal stability resistance of the polymeric fine particles occurs, and it causes acceleration of deterioration of the aromatic polycarbonate resin.

For example, it is assumed that produced radicals accelerate the isomerization reaction of the aromatic polycarbonate resin. Further, it is assumed that when the polymeric fine particles are produced by an emulsion polymerization method, residues of an emulsifier and the like used in emulsion polymerization accelerate the deterioration at the time of melt molding or exposure to heat.

Therefore, it is assumed that a combination of specific heat stabilizers in the present invention inhibits not only deterioration of the aromatic polycarbonate resin caused by those factors but also deterioration of the polymeric fine particles themselves and impurities contained in the polymeric fine particles exert an effect of preventing acceleration of the deterioration. Further, it is assumed that since a phosphate based heat stabilizer, a phosphite based heat stabilizer or a phosphonite based heat stabilizer shows low light absorbability together with the above effect of preventing yellowing of the aromatic polycarbonate resin composition, the composition can retain high brightness when used as a light diffusion sheet.

That is, according to the present invention, there is provided a direct backlight type liquid crystal display device comprising:

a backlight source, a light diffusion sheet which may have a protective film on a surface thereof which faces the backlight source or on both surfaces thereof as desired, a light ray adjusting film, and a liquid crystal panel, wherein the light diffusion sheet is formed from a composition comprising:

(A) 80 to 99.995 wt % of aromatic polycarbonate resin (component A), and (B) 0.005 to 20 wt % of polymeric fine particles (component B) having an average particle diameter of 0.01 to 50 μm, and (C) 0.001 to 5 parts by weight of at least one heat stabilizer (component C) selected from the group consisting of a phosphate compound (component C-1), a phosphate compound (component C-2) and a phosphonite compound (component C-3), (D) 0 to 2 parts by weight of ultraviolet absorber (component D), and (E) 0.0001 to 3 parts by weight of fluorescent whitening agent (component E), based on 100 parts by weight of the total of the components A and B.

Further, according to the present invention, there is also provided A light diffusion sheet for a direct backlight which is formed from a composition comprising:

is formed from a composition comprising:

(A) 80 to 99.995 wt % of aromatic polycarbonate resin (component A), and (B) 0.005 to 20 wt % of polymeric fine particles (component B) having an average particle diameter of 0.01 to 50 μm, and (C) 0.001 to 5 parts by weight of at least one heat stabilizer (component C) selected from the group consisting of a phosphate compound (component C-1), a phosphite compound (component C-2) and a phosphonite compound (component C-3), (D) 0 to 2 parts by weight of ultraviolet absorber (component D), and (E) 0.0001 to 3 parts by weight of fluorescent whitening agent (component E), based on 100 parts by weight of the total of the components A and B.

EXPLANATIONS OF NOTATIONS

Figure 1:
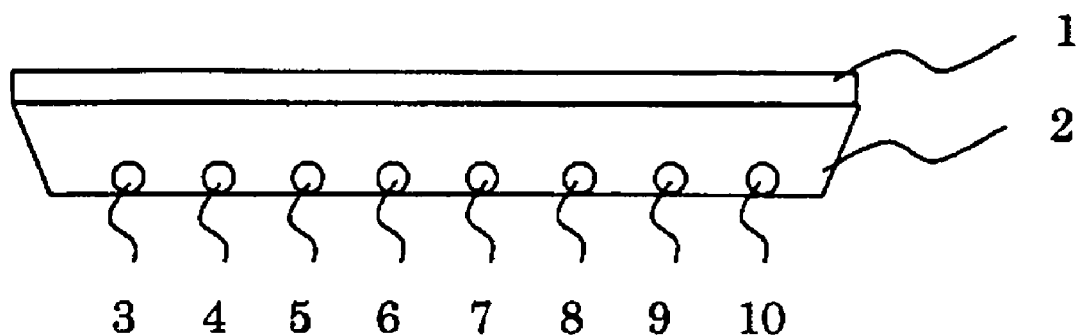
FIG. 1 is a schematic cross sectional view of a device which evaluates average brightness in a light diffusion sheet according to the present invention.

1: A test piece
2: A white reflective resin sheet
3 to 10: A light source
11 to 19: measuring points
A: A flat-plate test piece
B: A light source
γ: Diffusibility of light

BEST MODE FOR CARRYING OUT THE INVENTION

Hereinafter, the direct backlight type liquid crystal display device of the present invention will be described.

The direct backlight type liquid crystal display device of the present invention comprises a backlight source, a light diffusion sheet, a light ray adjusting film, and a liquid crystal panel. The device can be produced by disposing the backlight source, the light diffusion sheet, the light ray adjusting film and the liquid crystal panel in this order. Preferably, the device has a protective film on a surface of the light diffusion sheet which faces the backlight source or both surfaces of the light diffusion sheet as desired.

<Backlight Source>

The backlight source may have any shape such as a planar shape, a dot shape or a linear shape as long as it is disposed right underneath a light emitting surface. The backlight source may be any light source which can emit visible light. Although a white lamp, a fluorescent discharge tube, a light-emitting diode element, a fluorescent light-emitting element or the like can be used as the backlight source, the fluorescent discharge tube, a cathodoluminescent lamp in particular, is preferred from the viewpoints of brightness, color temperature and the like. In particular, recently, a low-power-consumption cathodoluminescent lamp using a three-wavelength fluorescent material which is highly bright and highly color-rendered is used.

The cathodoluminescent lamp which is used as the backlight source has a structure that a fluorescent material is coated on the inner wall of a glass tube filled with an appropriate amount of mercury and an inert gas (such as argon, neon or a mixed gas) and a columnar electrode is attached to both ends of the glass tube.

The mechanism of light emission of the cathodoluminescent lamp is as follows. That is, when a high voltage is applied to between the electrodes, a small number of electrons which exist in the tube are attracted to and collide with the electrodes at high speed, whereby secondary electrons are discharged and electric discharge starts. By the electric discharge, electrons which are attracted to the anode and mercury molecules in the tube collide with each other to emit ultraviolet radiation (of about 250 nm), and this ultraviolet radiation excites the florescent material, whereby visible light is emitted.

<Light Ray Adjusting Film>

The light ray adjusting film is a film capable of collecting, diffusing or polarizing light coming out of the diffuser. The light ray adjusting film is generally placed between the light diffusion sheet and the liquid crystal panel. A collecting film is a film having prism-shaped surfaces (such as BEF of Yamagata 3M Limited), a diffusing film is a film containing a diffusing agent, and a polarizing film is a multilayered film (such as D-BEF of Yamagata 3M Limited), for example.

They are disposed, for example, in the order of the collecting film, the diffusing film, the polarizing film and the diffusing film, from the diffuser side, and light having passed through the diffusing film enters the liquid crystal panel portion.

<Liquid Crystal Panel>

The liquid crystal panel has a polarizing plate disposed on at least one surface of a liquid crystal cell. The liquid crystal cell has electrodes, and at least one surface thereof is preferably transparent. Further, it may have a color filter between the liquid crystal cell and the polarizing plate as desired. The liquid crystal cell can be produced from glass or plastic such as a polymeric film.

<Light Diffusion Sheet>

The light diffusion sheet is formed from a composition comprising the following components A to E. Hereinafter, a description will be given to each of the components. The present invention includes the light diffusion sheet itself.

(Aromatic Polycarbonate Resin)

An aromatic polycarbonate resin (component A) is generally obtained by reacting a dihydric phenol with a carbonate precursor in accordance with an interfacial polycondensation method or a melt transesterification method. In addition, it is also obtained by polymerizing a carbonate prepolymer in accordance with a solid-phase transesterification method or polymerizing a cyclic carbonate compound in accordance with a ring-opening polymerization method.

Representative examples of the dihydric phenol include hydroquinone, resorcinol,
4,4'-dihydroxydiphenyl, bis(4-hydroxyphenyl)methane,
bis{(4-hydroxy-3,5-dimethyl)phenyl}methane,
1,1-bis(4-hydroxyphenyl)ethane,
1,1-bis(4-hydroxyphenyl)-1-phenylethane,
2,2-bis(4-hydroxyphenyl)propane (commonly referred to as "bisphenol A"),
2,2-bis{(4-hydroxy-3-methyl)phenyl}propane,
2,2-bis{(4-hydroxy-3,5-dimethyl)phenyl}propane,
2,2-bis{(4-hydroxy-3,5-dibromo)phenyl}propane,
2,2-bis{(3-isopropyl-4-hydroxy)phenyl}propane,
2,2-bis{(4-hydroxy-3-phenyl)phenyl}propane,
2,2-bis(4-hydroxyphenyl)butane,
2,2-bis(4-hydroxyphenyl)-3-methylbutane,
2,2-bis(4-hydroxyphenyl)-3,3-dimethylbutane,
2,4-bis(4-hydroxyphenyl)-2-methylbutane,
2,2-bis(4-hydroxyphenyl)pentane,
2,2-bis(4-hydroxyphenyl)-4-methylpentane,
1,1-bis(4-hydroxyphenyl)cyclohexane,
1,1-bis(4-hydroxyphenyl)-4-isopropyl cyclohexane,
1,1-bis(4-hydroxyphenyl)-3,3,5-trimethyl cyclohexane,
9,9-bis(4-hydroxyphenyl)fluorene,
9,9-bis{(4-hydroxy-3-methyl)phenyl}fluorene,
α,α'-bis(4-hydroxyphenyl)-o-diisopropyl benzene,
α,α'-bis(4-hydroxyphenyl)-m-diisopropyl benzene,
α,α'-bis(4-hydroxyphenyl)-p-diisopropyl benzene,
1,3-bis(4-hydroxyphenyl)-5,7-dimethyl adamantane,
4,4'-dihydroxydiphenyl sulfone,
4,4'-dihydroxydiphenyl sulfoxide,
4,4'-dihydroxydiphenyl sulfide,
4,4'-dihydroxydiphenyl ketone,
4,4'-dihydroxydiphenyl ether, and
4,4'-dihydroxydiphenyl ester. These may be used alone or in admixture of two or more.

Of these, a homopolymer or copolymer obtained from at least one bisphenol selected from the group consisting of bisphenol A,
2,2-bis{(4-hydroxy-3-methyl)phenyl}propane,
2,2-bis(4-hydroxyphenyl)butane,
2,2-bis(4-hydroxyphenyl)-3-methylbutane,
2,2-bis(4-hydroxyphenyl)-3,3-dimethylbutane,
2,2-bis(4-hydroxyphenyl)-4-methylpentane,
1,1-bis(4-hydroxyphenyl)cyclohexane,
1,1-bis(4-hydroxyphenyl)-3,3,5-trimethyl cyclohexane,
9,9-bis{(4-hydroxy-3-methyl)phenyl}fluorene and
α,α'-bis(4-hydroxyphenyl)-m-diisopropyl benzene is preferably used. In particular, a homopolymer of bisphenol A, a copolymer of bisphenol A and
9,9-bis{(4-hydroxy-3-methyl)phenyl}fluorene, and a copolymer of
1,1-bis(4-hydroxyphenyl)-3,3,5-trimethyl cyclohexane, bisphenol A, and
2,2-bis{(4-hydroxy-3-methyl)phenyl}propane or
α,α'-bis(4-hydroxyphenyl)-m-diisopropyl benzene is preferably used.

As the carbonate precursor, a carbonyl halide, a carbonate ester, a haloformate or the like is used. Specific examples thereof include phosgene, diphenyl carbonate and dihaloformate of dihydric phenol.

When the above dihydric phenol and the above carbonate precursor are reacted with each other by an interfacial polycondensation method or a melt transesterification method to produce the polycarbonate resin, a catalyst, a terminal blocking agent, an antioxidant for a dihydric phenol and the like may be used as required. Further, the polycarbonate resin may be a branched polycarbonate resin copolymerized with a polyfunctional aromatic compound having three or more functional groups, a polyester carbonate resin copolymerized with an aromatic or aliphatic difunctional carboxylic acid, or a mixture of two or more obtained polycarbonate resins.

Illustrative examples of the polyfunctional aromatic compound having three or more functional groups include phloroglucin, phloroglucide, trisphenols such as
4,6-dimethyl-2,4,6-tris(4-hydroxydiphenyl)heptene-2,2,4,6-trimethyl-2,4,6-tris(4-hydroxyphenyl)heptane,
1,3,5-tris(4-hydroxyphenyl)benzene,
1,1,1-tris(4-hydroxyphenyl)ethane,
1,1,1-tris(3,5-dimethyl-4-hydroxyphenyl)ethane,
2,6-bis(2-hydroxy-5-methylbenzyl)-4-methyl phenol and
4-{4-[1,1-bis(4-hydroxyphenyl)ethyl]benzene}-α,α-dimethylbenzyl phenol, tetra(4-hydroxyphenyl)methane,
bis(2,4-dihydroxyphenyl)ketone,
1,4-bis(4,4-dihydroxytriphenylmethyl)benzene, and trimellitic acid, pyromellitic acid, benzophenone tetracarboxylic acid and their acid chlorides. Of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

When the polyfunctional compound which produces the branched polycarbonate resin is contained, its amount is 0.001 to 1 mol %, preferably 0.005 to 0.5 mol %, particularly preferably 0.01 to 0.3 mol %, based on the total amount of the aromatic polycarbonate. Further, in the melt transesterification method in particular, a branched structure may be produced as a side reaction. The amount of the branched structure is also 0.001 to 1 mol %, preferably 0.005 to 0.5 mol %, particularly preferably 0.01 to 0.3 mol %, based on the total amount of the aromatic polycarbonate. The amount may be calculated in accordance with $^1$H-NMR measurement.

A reaction by the interfacial polycondensation method is generally a reaction between a dihydric phenol and phosgene and is carried out in the presence of an acid binder and an organic solvent. As the acid binder, an alkali metal hydroxide such as sodium hydroxide or potassium hydroxide or an amine compound such as pyridine is used, for example. As the organic solvent, a halogenated hydrocarbon such as methylene chloride or chlorobenzene is used, for example. Further, a catalyst such as a tertiary amine, a quaternary ammonium compound or a quaternary phosphonium compound, e.g., triethylamine, tetra-n-butyl ammonium bromide and tetra-n-butyl phosphonium bromide, can be used to accelerate the reaction. In that case, it is preferable that the reaction temperature be generally 0 to 40° C., the reaction time be about 10 minutes to 5 hours and the pH during the reaction be kept at 9 or higher.

Further, in the polymerization reaction, a terminal blocking agent is generally used. As the terminal blocking agent, a monofunctional phenol can be used. The monofunctional phenol is generally used as a terminal blocking agent to control a molecular weight. An example of the monofunctional phenol is a monofunctional phenol which is generally phenol or a lower alkyl substituted phenol and is represented by the following general formula:

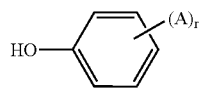

(wherein A is a hydrogen atom or a linear or branched alkyl or phenyl substituted alkyl group having 1 to 9 carbon atoms, and r is an integer of 1 to 5, preferably 1 to 3.)

Specific examples of the above monofunctional phenol include phenol, p-t-butyl phenol, p-cumyl phenol, and isooctyl phenol.

A reaction by the melt transesterification method is generally transesterification between a dihydric phenol and a carbonate ester and is carried out by a method in which the dihydric phenol and the carbonate ester are mixed together under heating in the presence of an inert gas and an alcohol or phenol produced is distilled out. Although the reaction temperature varies depending on the boiling point of the alcohol or phenol produced, it is generally 120 to 350° C. In the late stage of the reaction, the pressure of the system is reduced to about $1.33 \times 10^3$ to 13.3 Pa to facilitate distill-out of the alcohol or phenol produced. The reaction time is generally about 1 to 4 hours.

Illustrative examples of the carbonate ester include esters of an aryl group having 6 to 10 carbon atoms, aralkyl group or alkyl group having 1 to 4 carbon atoms which may be substituted. Specific examples thereof include diphenyl carbonate, bis(chlorophenyl)carbonate, dinaphthyl carbonate, bis(diphenyl)carbonate, dimethyl carbonate, diethyl carbonate and dibutyl carbonate. Of these, diphenyl carbonate is preferred.

Further, to increase a polymerization rate, a polymerization catalyst can be used. As the polymerization catalyst, catalysts which are generally used in an esterification reaction and a transesterification reaction, such as alkali metal compounds, e.g., sodium hydroxide, potassium hydroxide and sodium and potassium salts of dihydric phenol; alkaline earth metal compounds, e.g., calcium hydroxide, barium hydroxide and magnesium hydroxide; nitrogen-containing basic compounds, e.g., tetramethylammonium hydroxide, tetraethylammonium hydroxide, trimethylamine and triethylamine; alkoxides of alkali metals and alkaline earth metals; organic acid salts of alkali metals and alkaline earth metals; zinc compounds, boron compounds, aluminum compounds, silicon compounds, germanium compounds, organotin compounds, lead compounds, osmium compounds, antimony compounds, manganese compounds, titanium compounds and zirconium compounds can be used.

These catalysts may be used alone or in combination of two or more. These polymerization catalysts are preferably used in an amount of $1 \times 10^{-8}$ to $1 \times 10^{-3}$ equivalents, more preferably $1 \times 10^{-7}$ to $5 \times 10^{-4}$ equivalents, per mole of the dihydric phenol which is a raw material.

Further, in the polymerization reaction, a deactivator which neutralizes the activity of the catalyst is preferably used. Specific examples of the deactivator include, but not limited to, compounds such as tetrabutylphosphonium octyl sulfonate, tetrabutylphosphonium decyl sulfonate, tetrabutylphosphonium benzene sulfonate, tetraethylphosphonium dodecylbenzene sulfonate, tetrabutylphosphonium dodecylbenzene sulfonate, tetrahexylphosphonium dodecylbenzene sulfonate, tetraoctylphosphonium dodecylbenzene sulfonate, decylammonium butyl sulfate, decylammonium decyl sulfate, dodecylammonium methyl sulfate, dodecylammonium ethyl sulfate, dodecylmethylammonium methyl sulfate, dodecyldimethylammonium tetradecyl sulfate, tetradecyldimethylammonium methyl sulfate, tetramethylammonium hexyl sulfate, decyltrimethylammonium hexadecyl sulfate, tetrabutylammonium dodecylbenzyl sulfate, tetraethylammonium dodecylbenzyl sulfate, and tetramethylammonium dodecylbenzyl sulfate. These compounds may be used in combination of two or more.

The catalyst is preferably used in an amount of 0.5 to 50 mol per mol of the remaining catalyst. Further, the deactivator is preferably used in an amount of 0.01 to 500 ppm, more preferably 0.01 to 300 ppm, particularly preferably 0.01 to 100 ppm, based on the polycarbonate resin after polymerization.

The molecular weight of the polycarbonate resin is not particularly limited. When the molecular weight is lower than 10,000, high-temperature properties deteriorate, while when it is higher than 50,000, moldability deteriorates. Thus, the molecular weight of the polycarbonate resin is preferably 10,000 to 50,000, particularly preferably 14,000 to 30,000, in terms of viscosity average molecular weight. Two or more polycarbonate resins may be mixed together. The viscosity average molecular weight in the present invention is determined as follows. First, specific viscosity calculated by the following formula is determined from a solution having 0.7 g of polycarbonate resin dissolved in 100 ml of methylene chloride at 20° C. by use of Ostwald's viscometer.

specific viscosity $(\eta_{SP})=(t-t_0)/t_0$ [$t_0$: number of seconds that methylene chloride takes to drop, $t$: number of seconds that sample solution takes to drop]

The obtained specific viscosity is substituted into the following formula to determine a viscosity average molecular weight M.

$\eta_{SP}/c=[\eta]+0.45\times[\eta]^2 c$ $[\eta]=1.23\times10^{-4}M^{0.83}$ c=0.7

(Polymeric Fine Particles)

Polymeric fine particles (component B) are preferably spherical from the viewpoint of light diffusibility. The closer the particles become to a complete sphere, the more preferable it is.

Illustrative examples of the polymeric fine particles include cross-linked silicon particles and cross-linked organic particles obtained by polymerizing a non-cross-linkable monomer and a cross-linkable monomer. Illustrative examples of the non-cross-linkable monomer include an acryl-based monomer, a styrene-based monomer, an acrylonitrile-based monomer, and an olefin-based monomer. These may be used alone or in admixture of two or more. In addition, other copolymerizable monomers other than the above monomers can be used.

Meanwhile, amorphous heat-resistant polymer particles such as polyether sulfone particles can also be used as the polymeric fine particles of the present invention. In the case of the polymer particles, a cross-linkable monomer is not necessarily required, because the shape of the fine particles is not damaged even when the fine particles are melt-kneaded with the component A under heating.

Further, in the present invention, various epoxy resin particles, urethane resin particles, melamine resin particles, benzoguanamine resin particles, phenol resin particles and the like can also be used as the polymeric fine particles.

Further, as the component B, polymeric fine particles having an average particle diameter of 0.01 to 50 μm are used, those having an average particle diameter of 0.1 to 10 μm are preferably used, and those having an average particle diameter of 1 to 10 μm are more preferably used. Further, the component B preferably has narrow particle size distribution. The component B more preferably has distribution that particles having an average particle diameter of ±2 μm constitute 70 wt % or more of all particles.

Further, the absolute value of the difference between the refractive index of the polymeric fine particles as the component B and the refractive index of the component A is preferably 0.02 to 0.3, more preferably 0.10 to 0.25, much more preferably 0.12 to 0.20, particularly preferably 0.14 to 0.20.

Within the above refractive index range, a larger difference in refractive index is more preferred. From this viewpoint, the polymeric fine particles are particularly desirably cross-linked silicone particles.

Illustrative examples of the cross-linked silicone particles include those comprising a siloxane bond as a main skeleton and having an organic substituent on a silicon atom, those with a high degree of cross-linking as typified by polymethyl silsesquioxane, and those with a low degree of cross-linking as typified by a methyl silicone rubber particles. In the present invention, the cross-linked silicone particles with a high degree of cross-linking as typified by polymethyl silsesquioxane are preferred. As the organic substituent for the silicon atom in the cross-linked silicone particles, an alkane group such as a methyl group, an ethyl group, a propyl group or a butyl group, an aryl group such as a phenyl group, an aralkyl group such as a benzyl group, a carboxyl group, a carbonyl group, an ester group, an ether group, and the like can be used.

As a method of producing the cross-linked silicone particles, a method comprising forming three-dimensionally cross-linked particles while growing a siloxane bond by subjecting, for example, a trifunctional alkoxysilane to hydrolysis in water and a condensation reaction is generally used. The particle diameter can be controlled by the amount of an alkali in the catalyst, an agitation step and the like.

Further, as the acryl-based monomer used in the cross-linked organic particles, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, phenyl methacrylate and the like can be used alone or in admixture of two or more. Of these, methyl methacrylate is particularly preferred.

As the styrene-based monomer, styrene, an alkyl styrene such as α-methyl styrene, methyl styrene (vinyl toluene) or ethyl styrene, and a halogenated styrene such as brominated styrene can be used. Of these, styrene is particularly preferred. As the acrylonitrile-based monomer, acrylonitrile and methacrylonitrile can be used. Further, as the olefin-based monomer, ethylene, various norbornene type compounds, and the like can be used. Further, illustrative examples of other copolymerizable monomers include glycidyl methacrylate, N-methyl maleimide, and maleic anhydride. Accordingly, the cross-linked organic particles may also have a unit such as N-methyl glutarimide.

Meanwhile, illustrative examples of the cross-linkable monomer to be used in combination with the above non-cross-linkable monomer include divinylbenzene, allyl methacrylate, triallyl cyanurate, triallyl isocyanate, ethylene glycol di(meth)acrylate, diethylene glycol di(meth)acrylate, propylene glycol (meth)acrylate, 1,6-hexanediol di(meth)acrylate, trimethylolpropane (meth)acrylate, pentaerythritol tetra(meth)acrylate, bisphenol A di(meth)acrylate, dicyclopentanyl di(meth)acrylate, dicyclopentenyl di(meth)acrylate, and N-methylol (meth)acrylamide.

Illustrative examples of a method for producing the cross-linked organic particles comprising the acryl-based monomer or the like include, in addition to a commonly used emulsion polymerization method, a soap-free polymerization method using an initiator such as potassium persulfate, a seed polymerization method, and a two-step swelling polymerization method. Further, a suspension polymerization method in which a water phase and a monomer phase are retained separately, the phases are fed to a continuous disperser accurately and the particle diameter is controlled by the number of rotations of the disperser and a suspension polymerization method in which a monomer phase is fed into an aqueous liquid having dispersion power through small orifices of several to several tens of micrometers or a porous filter to control the particle diameter in a continuous production method can also be used.

Illustrative examples of a method for producing polymeric fine particles other than the cross-linked organic particles include a spray drying method, a submerged curing method (coagulation method), a phase separation method (coacervation) method, a solvent evaporation method, and a reprecipitation method. These methods may be carried out in combination with a nozzle vibration method or the like.

The component B may be in the form of a single-phase polymer or a core-shell polymer or may take an IPN structure having a structure that two or more components are entangled with one another. In addition, complex particles each comprising an inorganic fine particle as a core and an organic cross-linked particle as a shell or complex particles each comprising an organic cross-linked particle as a core and an epoxy resin, an urethane resin or the like as a shell can also be used.

The amount of the component B is 0.005 to 20 wt %, preferably 0.01 to 15 wt %, more preferably 0.02 to 5 wt %, particularly preferably 0.1 to 2 wt %, based on 100 wt % of the total of the components A and B. When the amount of the component B is smaller than 0.005 wt %, satisfactory light diffusibility cannot be attained, while when the amount is larger than 20 wt %, light transmittance is unsatisfactory disadvantageously.

(Heat Stabilizer)

In the present invention, as the component C, at least one heat stabilizer selected from the group consisting of a phosphate compound (component C-1), a phosphite compound (component C-2) and a phosphonite compound (component C-3) shows an effect of preventing yellowing of the polycarbonate resin composition and an effect of retaining high brightness when used as a light diffusion sheet.

The amount of the component C is 0.001 to 5 parts by weight, preferably 0.002 to 3 parts by weight, more preferably 0.005 to 2 parts by weight, much more preferably 0.01 to 1 part by weight, particularly preferably 0.02 to 0.5 parts by weight, based on 100 parts by weight of the total of the components A and B. When the amount of the component C is smaller than 0.001 parts by weight, satisfactory discoloration resistance during melt processing (hereinafter may be referred to as "melt discoloration resistance") and satisfactory discoloration resistance when exposed to heat in the air for a long time (hereinafter may be referred to as "dry heat discoloration resistance") cannot be attained, while when it is larger than 5 parts by weight, the dry heat discoloration resistance may be degraded due to the influence of moisture, and deterioration in the polycarbonate resin composition may occur disadvantageously.

(Component C-1)

The phosphate compound (component C-1) is preferably a compound represented by the following formula (1).

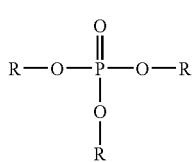

(1)

(wherein Rs are the same as or different from one another and represent an alkyl group having 1 to 15 carbon atoms.)

The phosphate compound (component C-1) is preferably a phosphate compound having an alkyl group having 1 to 12 carbon atoms, more preferably a phosphate compound having an alkyl group having 1 to 5 carbon atoms, particularly preferably trimethyl phosphate. The component C-1 is a compound suited particularly to conditions requiring satisfactory melt discoloration resistance. To be more specific, the component C-1 has an effect of preventing discoloration of the polycarbonate resin composition when the composition is melt-extruded into a light diffusion sheet.

The amount of the component C-1 is preferably 0.001 to 3 parts by weight, more preferably 0.01 to 2 parts by weight, much more preferably 0.01 to 0.5 parts by weight, particularly preferably 0.02 to 0.1 parts by weight, based on 100 parts by weight of the total of the components A and B.

(Component C-2)

As the phosphate compound (component C-2), a compound represented by the following formula (2-1) or (2-2) is preferably used. The phosphite compound is particularly preferably a compound represented by the following formula (2-1).

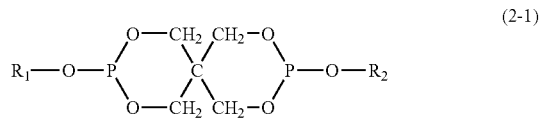

(2-1)

(wherein $R_1$ and $R_2$ each represent a hydrogen atom, an alkyl group having 1 to 20 carbon atoms, a substituted or unsubstituted aryl group having 6 to 30 carbon atoms, a substituted or unsubstituted aralkyl group having 7 to 30 carbon atoms, a substituted or unsubstituted cycloalkyl group having 4 to 20 carbon atoms or a 2-(oxyphenyl)propyl-substituted aryl group having 15 to 25 carbon atoms.)

Specific examples of the alkyl group having 1 to 20 carbon atoms include a nonyl group and an octadecyl group. Specific examples of the aryl group having 6 to 30 carbon atoms include a phenyl group. Specific examples of the cycloalkyl group having 4 to 20 carbon atoms include a cyclohexyl group.

A substituent which substitutes the above aryl group, aralkyl group and cycloalkyl group is preferably an alkyl group having 1 to 10 carbon atoms.

The pentaerythritol diphosphite compound represented by the formula (2-1) is a compound suited to conditions requiring melt discoloration resistance and dry heat discoloration resistance in the polycarbonate resin composition containing the polymeric fine particles. To be more specific, the pentaerythritol diphosphite compound has an effect of preventing discoloration of the polycarbonate resin composition when the composition is melt-extruded into a light diffusion sheet and discoloration of the light diffusion sheet when the diffuser is exposed to a light source.

Specific examples of the compound represented by the formula (2-1) include distearyl pentaerythritol diphosphite, bis(2,4-di-t-butylphenyl)pentaerythritol diphosphite, bis(2,6-di-t-butyl-4-methylphenyl)pentaerythritol diphosphite, phenyl bisphenol A pentaerythritol diphosphite, and dicyclohexyl pentaerythritol diphosphite. Preferred examples thereof include distearyl pentaerythritol diphosphite, bis(2,4-di-t-butylphenyl)pentaerythritol diphosphite, and bis(2,6-di-t-butyl-4-methylphenyl)pentaerythritol diphosphite. The phosphite compounds can be used alone or in combination of two or more.

As the phosphite compound (component C-2), a phosphite compound represented by the following formula (2-2) can be used.

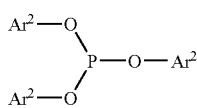
(2-2)

(wherein Ar²s are the same as or different from one another and an aryl group having 8 to 20 carbon atoms substituted with 2 to 4 alkyl groups.)

An example of the substitutional alkyl group is an alkyl group having 1 to 5 carbon atoms. An example of the aryl group is a phenyl group.

Specific examples of the phosphite compound represented by the above formula (2-2) include
tris(dimethylphenyl)phosphite,
tris(diethylphenyl)phosphite,
tris(di-iso-propylphenyl)phosphite,
tris(di-n-butylphenyl)phosphite,
tris(2,4-di-t-butylphenyl)phosphite, and
tris(2,6-di-t-butylphenyl)phosphite. Tris(dialkyl substituted phenyl)phosphite is preferred,
tris(di-t-butylphenyl)phosphite is more preferred, and tris(2,4-di-t-butylphenyl)phosphite is particularly preferred. These compounds may be used alone or in admixture of two or more.

The amount of the component C-2 is preferably 0.001 to 5 parts by weight, more preferably 0.002 to 3 parts by weight, much more preferably 0.005 to 2 parts by weight, particularly preferably 0.01 to 1 part by weight, the most preferably 0.02 to 0.5 parts by weight, based on 100 parts by weight of the total of the components A and B. When the amount of the component C-2 is equal to or larger than 0.001 parts by weight, satisfactory melt discoloration resistance and satisfactory dry heat discoloration resistance are attained, while when it is equal to or smaller than 5 parts by weight, deterioration in the dry heat discoloration resistance due to the influence of moisture does not occur advantageously.

(Component C-3)
The phosphonite compound (component C-3) is preferably a compound represented by the following formula (3-1).

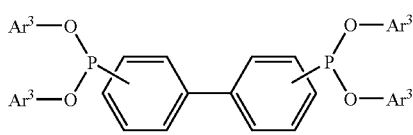
(3-1)

(wherein Ar³s are the same as or different from one another and represent an aryl group having 6 to 20 carbon atoms which is unsubstituted or substituted with an alkyl group.)

An example of the substitutional alkyl group is an alkyl group having 1 to 5 carbon atoms. An example of the aryl group is a phenyl group.

Specific examples of the phosphonite compound represented by the above formula (3-1) include
tetrakis(2,4-di-iso-propylphenyl)-4,4'-biphenylene diphosphonite,
tetrakis(2,4-di-n-butylphenyl)-4,4'-biphenylene diphosphonite,
tetrakis(2,4-di-t-butylphenyl)-4,4'-biphenylene diphosphonite,
tetrakis(2,4-di-t-butylphenyl)-4,3'-biphenylene diphosphonite,
tetrakis(2,4-di-t-butylphenyl)-3,3'-biphenylene diphosphonite,
tetrakis(2,6-di-iso-propylphenyl)-4,4'-biphenylene diphosphonite,
tetrakis(2,6-di-n-butylphenyl)-4,4'-biphenylene diphosphonite,
tetrakis(2,6-di-t-butylphenyl)-4,4'-biphenylene diphosphonite,
tetrakis(2,6-di-t-butylphenyl)-4,3'-biphenylene diphosphonite, and
tetrakis(2,6-di-t-butylphenyl)-3,3'-biphenylene diphosphonite.
Tetrakis(di-t-butylphenyl)biphenylene diphosphonite is preferred, and
tetrakis(2,4-di-t-butylphenyl)biphenylene diphosphonite is more preferred. The tetrakis(2,4-di-t-butylphenyl)biphenylene diphosphonite is preferably a mixture of two or more. To be more specific, a mixture of tetrakis(2,4-di-t-butylphenyl)-4,4'-biphenylene diphosphonite (component C-3-a-1), tetrakis(2,4-di-t-butylphenyl)-4,3'-biphenylene diphosphonite (component C-3-a-2) and tetrakis(2,4-di-t-butylphenyl)-3,3'-biphenylene diphosphonite (component C-3-a-3) is more preferred. Further, the mixing ratio of the components C-3-a-1, C-3-a-2 and C-3-a-3 in this mixture is preferably 100:37 to 64:4 to 14, more preferably 100:40 to 60:5 to 11, in terms of weight ratio.

Further, a phosphonite compound represented by the following formula (3-2) can also be used.

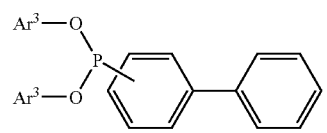
(3-2)

(wherein Ar³s are the same as or different from each other and represent an aryl group having 6 to 20 carbon atoms which is unsubstituted or substituted with an alkyl group.)

An example of the substitutional alkyl group is an alkyl group having 1 to 5 carbon atoms. An example of the aryl group is a phenyl group.

Specific examples of the phosphonite compound represented by the above formula (3-2) include
bis(2,4-di-iso-propylphenyl)-4-phenyl-phenyl phosphonite,
bis(2,4-di-n-butylphenyl)-3-phenyl-phenyl phosphonite,
bis(2,4-di-t-butylphenyl)-4-phenyl-phenyl phosphonite,
bis(2,4-di-t-butylphenyl)-3-phenyl-phenyl phosphonite,
bis(2,6-di-iso-propylphenyl)-4-phenyl-phenyl phosphonite,
bis(2,6-di-n-butylphenyl)-3-phenyl-phenyl phosphonite,
bis(2,6-di-t-butylphenyl)-4-phenyl-phenyl phosphonite, and
bis(2,6-di-t-butylphenyl)-3-phenyl-phenyl phosphonite. Bis(di-t-butylphenyl)-phenyl-phenyl phosphonite is preferred, and
bis(2,4-di-t-butylphenyl)-phenyl-phenyl phosphonite is more preferred.

The bis(2,4-di-t-butylphenyl)-phenyl-phenyl phosphonite is preferably a mixture of two or more. To be more specific, a mixture of
bis(2,4-di-t-butylphenyl)-4-phenyl-phenyl phosphonite (component C-3-b-1) and
bis(2,4-di-t-butylphenyl)-3-phenyl-phenyl phosphonite (component C-3-b-2) is more preferred. Further, the mixing ratio of the components C-3-b-1 and C-3-b-2 in this mixture is preferably 5:1 to 4, more preferably 5:2 to 3, in terms of weight ratio.

When the component C-3 is used, the amount thereof is preferably 0.0001 to 1.0 parts by weight, more preferably 0.001 to 0.4 parts by weight, particularly preferably 0.002 to 0.3 parts by weight, based on 100 parts by weight of total of the components A and B. Use of the component C-3 is preferred because satisfactory melt discoloration resistance and satisfactory dry heat discoloration resistance are obtained.

The polycarbonate resin composition forming the light diffusion sheet of the present invention contains substantially no hindered phenol compound. The hindered phenol compound is a compound which is generally used as a heat stabilizer for a polycarbonate resin. It is a compound which exhibits an excellent effect on discoloration resistance (dry heat discoloration resistance) when exposed to heat in the air for a long time, in particular. However, when the hindered phenol compound is added to a polycarbonate resin composition, there occurs a problem that a light diffusion sheet formed from the resin composition does not have satisfactory brightness. Accordingly, the content of the hindered phenol compound in the polycarbonate resin composition is preferably lower than 0.01 parts by weight, more preferably lower than 0.005 parts by weight, particularly preferably lower than 0.001 parts by weight, based on 100 parts by weight of the total of the components A and B.

Specific examples of the hindered phenol compound include n-octadecyl-β-(4'-hydroxy-3',5'-di-t-butylphenyl)propionate, pentaerythritol tetrakis[3-(3,5-di-t-butyl-4-hydroxyphenyl)propionate], 4,4'-butylidene bis(3-methyl-6-t-butylphenol), triethylene glycol-N-bis-3-(3-t-butyl-4-hydroxy-5-methylphenyl)propionate, 1,6-hexanediol bis[3-(3,5-di-t-butyl-4-hydroxyphenyl)propionate, and 3,9-bis{2-[3-(3-t-butyl-4-hydroxy-5-methylphenyl)propionyloxy]-1,1,-dimethylethyl}-2,4,8,10-tetraoxa spiro[5,5]undecane.

(Ultraviolet Absorber)

In the present invention, an ultraviolet absorber is used as the component D. A light diffusion sheet formed from a polycarbonate resin composition is liable to discolor when exposed to light of various wavelengths ranging from ultraviolet radiation to visible light and various intensities from a light source intermittently or continuously for a long time. The ultraviolet absorber is used to prevent the discoloration.

The following ultraviolet absorbers can be used in the present invention. Specific examples of a benzophenone-based ultraviolet absorber include
2,4-dihydroxybenzophenone,
2-hydroxy-4-methoxybenzophenone,
2-hydroxy-4-octoxybenzophenone,
2-hydroxy-4-benzyloxybenzophenone,
2-hydroxy-4-methoxy-5-sulfoxybenzophenone,
2-hydroxy-4-methoxy-5-sulfoxytrihydrideratebenzophenone,
2,2'-dihydroxy-4-methoxybenzophenone,
2,2',4,4'-tetrahydroxybenzophenone,
2,2'-dihydroxy-4,4'-dimethoxybenzophenone,
2,2'-dihydroxy-4,4'-dimethoxy-5-sodium sulfoxybenzophenone,
bis(5-benzoyl-4-hydroxy-2-methoxyphenyl)methane,
2-hydroxy-4-n-dodecyloxybenzophenone, and
2-hydroxy-4-methoxy-2'-carboxybenzophenone.

Specific examples of a benzotriazole-based ultraviolet absorber include
2-(2-hydroxy-5-methylphenyl)benzotriazole,
2-(2-hydroxy-5-t-octylphenyl)benzotriazole,
2-(2-hydroxy-3,5-dicumylphenyl)phenyl benzotriazole,
2-(2-hydroxy-3-t-butyl-5-methylphenyl)-5-chlorobenzotriazole,
2,2'-methylenebis[4-(1,1,3,3-tetramethylbutyl)-6-(2H-benzotriazole-2-yl)phenol],
2-(2-hydroxy-3,5-di-t-butylphenyl)benzotriazole,
2-(2-hydroxy-3,5-di-t-butylphenyl)-5-chlorobenzotriazole,
2-(2-hydroxy-3,5-di-t-amylphenyl)benzotriazole,
2-(2-hydroxy-5-t-octylphenyl)benzotriazole,
2-(2-hydroxy-5-t-butylphenyl)benzotriazole,
2-(2-hydroxy-4-octoxyphenyl)benzotriazole,
2,2'-methylenebis(4-cumyl-6-benzotriazolephenyl),
2,2'-p-phenylenebis(1,3-benzoxazine-4-one), and
2-[2-hydroxy-3-(3,4,5,6-tetrahydrophthalimidemethyl)-5-methylphenyl]benzotriazole.

Preferred are
2-(2-hydroxy-5-t-octylphenyl)benzotriazole,
2-(2-hydroxy-3,5-dicumylphenyl)phenyl benzotriazole,
2-(2-hydroxy-3-t-butyl-5-methylphenyl)-5-chlorobenzotriazole and
2,2'-methylenebis[4-(1,1,3,3-tetramethylbutyl)-6-(2H-benzotriazole-2-yl)phenol].

Specific examples of a benzoxazine-based ultraviolet absorber include
2,2'-p-phenylenebis(3,1-benzoxazine-4-one),
2,2'-m-phenylenebis(3,1-benzoxazine-4-one), and
2,2'-p,p'-diphenylenebis(3,1-benzoxazine-4-one).

Further, specific examples of a hydroxyphenyltriazine-based ultraviolet absorber include 2-(4,6-diphenyl-1,3,5-triazine-2-yl)-5-hexyloxyphenol,
2-(4,6-diphenyl-1,3,5-triazine-2-yl)-5-methyloxyphenol,
2-(4,6-diphenyl-1,3,5-triazine-2-yl)-5-ethyloxyphenol,
2-(4,6-diphenyl-1,3,5-triazine-2-yl)-5-propyloxyphenol, and
2-(4,6-diphenyl-1,3,5-triazine-2-yl)-5-butyloxyphenol. Specific examples thereof further include compounds resulting from substituting the phenyl groups of the above enumerated compounds with a 2,4-dimethylphenyl group, such as 2-(4,6-bis(2,4-dimethylphenyl)-1,3,5-triazine-2-yl)-5-hexyloxyphenol.

Further, the ultraviolet absorber may be a polymer-type ultraviolet absorber resulting from copolymerizing a radical polymerizable ultraviolet absorbing monomer and/or light stabilizing monomer with a monomer such as alkyl (meth) acrylate. Suitable examples of the above ultraviolet absorbing monomer include compounds containing a benzotriazole skeleton, a benzophenone skeleton, a triazine skeleton and a benzoxazine skeleton in the ester substituent of (meth)acrylate. These ultraviolet absorbers can be used alone or in combination of two or more.

Of the above ultraviolet absorbers, at least one ultraviolet absorber selected from the group consisting of the benzophenone-based ultraviolet absorber, the benzotriazole-based ultraviolet absorber and the benzoxazine-based ultraviolet absorber is preferably used.

The content of the component D is preferably 0 to 2 parts by weight, more preferably 0.01 to 1 part by weight, much more preferably 0.01 to 0.8 parts by weight, particularly preferably 0.02 to 0.5 parts by weight, based on 100 parts by weight of the total of the components A and B. When the content of the ultraviolet absorber is higher than 2 parts by weight, deterioration of the light diffusion sheet of the present invention occurs disadvantageously.

Further, when the light diffusion sheet has a protective film which contains the ultraviolet absorber, the content of the component D is preferably 0 to 0.5 parts by weight, more preferably 0 to 0.3 parts by weight, based on 100 parts by weight of the total of the components A and B. Meanwhile, when the light diffusion sheet has no protective film, the content of the component D is preferably 0.01 to 2 parts by weight, more preferably 0.02 to 1 part by weight, based on 100 parts by weight of the total of the components A and B.

(Fluorescent Whitening Agent)

In the polycarbonate resin composition, a fluorescent whitening agent is used as the component E. Use of the fluorescent whitening agent improves the color of the polycarbonate resin composition to white or blue white and improves the brightness of the diffuser formed from the polycarbonate resin composition. The fluorescent whitening agent has an effect of absorbing energy of the ultraviolet portion of light and emitting this energy to the visible portion.

Illustrative examples of fluorescent whitening agents usable in the present invention include a stilbene-based compound, a benzimidazole-based compound, a benzoxazole-based compound, a naphthalimide-based compound, a rhodamine-based compound, a coumarin-based compound, and an oxazine-based compound. Of these, the benzoxazole-based compound and the coumarin-based compound are preferred. These fluorescent whitening agents can be used alone or in combination of two or more. Specific examples thereof include KAYALIGHT OS (CI Fluorescent Brightener 219:1, benzoxazole-based compound) of NIPPON KAYAKU CO., LTD., HAKKOL PSR (coumarin-based compound) of HAKKOL CHEMICAL CO., LTD., and EASTOBRITE OB-1 of EASTOMAN CHEMICAL CO., LTD.

The content of the florescent whitening agent is 0.0001 to 3 parts by weight, preferably 0.0002 to 0.5 parts by weight, more preferably 0.0003 to 0.1 parts by weight, particularly preferably 0.0005 to 0.05 parts by weight, based on 100 parts by weight of the total of the components A and B. When the content is lower than 0.0001 parts by weight, the effects of improving the color and improving the brightness cannot be obtained. The effect of improving the color is also weak when the content is higher than 3 parts by weight.

(Mold Releasing Agent)

the present invention, a mold releasing agent can be used as required. The mold releasing agent may be a mold releasing agent which comprises at least 90 wt % of monohydric alcohol and monovalent fatty acid ester and/or polyhydric alcohol and fatty acid ester, for example.

A higher fatty acid ester of a monohydric or polyhydric alcohol as the mold releasing agent is preferably an ester of a monohydric or polyhydric alcohol having 1 to 20 carbon atoms and a saturated fatty acid having 5 to 30 carbon atoms. Illustrative examples of the ester of the monohydric or polyhydric alcohol and the saturated fatty acid include stearyl stearate, palmityl palmitate, butyl stearate, methyl laurate, isopropyl palmitate, 2-ethylhexyl stearate, monoglyceride stearate, triglyceride stearate, sorbitan distearate, pentaerythritol tetrastearate, pentaerythritol tetrapelargonate, and propylene glycol distearate. These can be used alone or in admixture of two or more. Of these, monoglyceride stearate, triglyceride stearate, stearyl stearate and pentaerythritol tetrastearate are preferably used.

The mold releasing agent may be used in a given amount suitable for a specific application. The amount thereof is preferably about 0.02 to 1 part by weight based on 100 parts by weight of the total of the components A and B.

(Dye)

Further, the polycarbonate resin composition may also contain various fluorescent dyes typified by an anthraquinone-based dye, a perylene-based dye, a coumarin-based dye, a thioindigo-based dye and a thioxanthone-based dye, ferrocyanides such as Prussian blue, and organic dyes typified by a perinone-based dye, a quinoline-based dye, a quinacridone-based dye, a dioxazine-based dye, an isoindolinone-based dye and a phthalocyanine-based dye.

In particular, a bluing agent may be contained to eliminate a yellow tinge of a molded article caused by the polycarbonate resin and/or the ultraviolet absorber. As the bluing agent, any bluing agent used for a polycarbonate resin can be used without any particular problem. In general, an anthraquinone-based dye is easy to obtain and preferred.

Specific examples of the bluing agent include Solvent Violet 13 [CA. No (color index No) 60725; "Macrolex Violet B" (Trademark) of Bayer AG, "Diaresin Blue G" of Mitsubishi Chemical Corporation, "Sumiplast Violet B" of Sumitomo Chemical Co., Ltd.], Solvent Violet 31 [CA. No 68210; "Diaresin Violet D" (Trademark) of Mitsubishi Chemical Corporation], Solvent Violet 33 [CA. No 60725; "Diaresin Blue J" (Trademark) of Mitsubishi Chemical Corporation], Solvent Blue 94 [CA. No 61500; "Diaresin Blue N" (Trademark) of Mitsubishi Chemical Corporation], Solvent Violet 36 [CA. No 68210; "Macrolex Violet 3R" (Trademark) of Bayer AG], Solvent Blue 97 ["Macrolex Blue RR" (Trademark) of Bayer AG], and Solvent Blue 45 [CA. No 61110; "Tetrasol Blue RLS" (Trademark) of Sandoz Ltd.]. These bluing agents are preferably used in an amount of about 0.00001 to 0.0006 parts by weight based on 100 parts by weight of the total of the components A and B.

(Method for Producing Polycarbonate Resin Composition)

The polycarbonate resin composition can be produced by a method of mixing the components A to E together by use of a tumbler, a V-shaped blender, a super mixer, a nauta mixer, a Banbury mixer, a kneading roll, a single-screw extruder, a twin-screw extruder or the like. In addition, there can also be used a method comprising adding the additives with the polycarbonate resin kept in a molten state after completion of melt polymerization or a method comprising mixing the aromatic polycarbonate resin in a solution state with the polymeric fine particles in an emulsion state, adding the additives and then removing a solvent and the like.

Further, since the light diffusion sheet of the present invention is often used in applications requiring high optical properties, the presence of foreign matters which inhibit the optical properties is preferably reduced. To obtain a polycarbonate resin composition preferred for these applications, it is preferred that a raw material containing a small quantity of foreign matters be used, manufacturing equipment such as an extruder and a pelletizer be placed in a clean air atmosphere, cooling water for a cooling bath which contains a small quantity of foreign matters be used, and a raw material feed hopper, a feed pass, a storage tank for obtained pellets and the like be filled with clean air. For example, a method similar to that proposed in JP-A 11-21357 can be employed.

(Method for Producing Light Diffusion Sheet)

The thus obtained polycarbonate resin composition can be molded into a light diffusion sheet in the form of a film or sheet by melt extrusion using an extruder or injection molding using an injection molding machine. The thickness of the light diffusion sheet is preferably 0.5 to 10 mm, more preferably 0.5 to 8 mm, much more preferably 1 to 8 mm.

<Protective Film>

A protective film can be placed on a surface of the light diffusion sheet which faces the backlight source or on both surfaces of the light diffusion sheet as desired.

The protective film is preferably an organic polymeric film containing 0.1 to 50 wt % of ultraviolet absorber (component $D^p$) and having a thickness of 0.1 to 500 μm.

The organic polymer constituting the protective film is preferably an acrylic resin, a polycarbonate resin, a polyethylene resin or a polyester resin. Of these, the acrylic resin or the polycarbonate resin is more preferred.

The acrylic resin is a resin obtained by polymerizing an acryl-based monomer. As the acryl-based monomer, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, phenyl methacrylate and the like can be used alone or in admixture of two or more.

Illustrative examples of the polyester resin include a polyethylene terephthalate resin, a polybutylene terephthalate resin, and a polyethylene naphthalate resin. Further, a polyester elastomer can also be used.

The protective film preferably contains, as the ultraviolet absorber (component $D^p$), at least one ultraviolet absorber selected from the group consisting of a benzophenone-based ultraviolet absorber, a benzotriazole-based ultraviolet absorber and a benzoxazine-based ultraviolet absorber. Specific examples thereof are the same as those presented for the above component D. The concentration of the ultraviolet absorber (component $D^p$) in the protective film is preferably 0.1 to 50 wt %, more preferably 0.5 to 40 wt %, much more preferably 1 to 30 wt %.

As for a method for laminating the protective film on the light diffusion sheet, there can be used any of a lamination method comprising melt-extruding an organic polymeric composition forming a protective film on an extruded polycarbonate resin composition film or sheet through a T die, a method comprising laminating a pre-molded protective film on a surface of a polycarbonate resin composition film or sheet continuously by use of heating rolls during the production process of the film or sheet, a coextrusion method comprising laminating a polycarbonate resin composition film or sheet and an organic polymeric composition forming a protective film by melt-extruding them simultaneously and a method comprising applying a coating which contains an organic polymeric composition forming a protective film onto a polycarbonate resin composition film or sheet by a coating method such as dip coating, flow coating or roll coating.

The thickness of the protective film is preferably 0.1 to 500 μm, more preferably 1 to 100 μm, much more preferably 2 to 70 μm. In the case of the lamination method or the coextrusion method, the thickness of the protective film is preferably 10 to 500 μm, more preferably 20 to 100 μm. In the case of the coating method, the thickness of the protective film is preferably 0.1 to 20 μm, more preferably 1 to 10 μm.

Inclusion of the ultraviolet absorber in the protective film inhibits deterioration of the resin of the polycarbonate resin light diffusion sheet by light from the backlight source efficiently and prevents deterioration in brightness and a change in color. It is important to cause the ultraviolet absorber to exist in high density near a surface of the light diffusion sheet which faces the backlight source, because the deterioration of the resin of the polycarbonate resin light diffusion sheet by light from the backlight source starts from the surface of the light diffusion sheet which faces the backlight source.

The amount W (g) of the ultraviolet absorber in the protective film is represented by the following expression.

$$W(g) = t(m) \times A(m^2) \times r(g/cm^3) \times 10^6 \times u(\text{wt \%}) \times 10^{-2}$$

W: amount (g) of ultraviolet absorber in protective film
t: thickness (m) of protective film
A: area ($m^2$) of protective film
r: specific gravity ($g/cm^3$) of resin of protective film
u: concentration (wt %) of ultraviolet absorber in protective film Therefore, the content W/A ($g/m^2$) per unit area of the ultraviolet absorber in the protective film is represented by the following expression.

$$W/A(g/m^2) = t \times r \times u \times 10^4$$

In the present invention, W/A is preferably 0.01 to 20 $g/m^2$, more preferably 0.1 to 10 $g/m^2$, much more preferably 0.2 to 5 $g/m^2$, particularly preferably 0.3 to 2 $g/m^2$. Therefore, in the present invention, it is preferable that the concentration (u) of the ultraviolet absorber in the protective film be decreased as the thickness of the protective film is increased and be increased as the thickness of the protective film is decreased.

Further, the ratio (t/T) between the thickness (t, unit: m) of the protective film and the thickness (T, unit: m) of the light diffusion sheet is preferably 1/10,000 to 1/10, more preferably 1/8,000 to 1/15, much more preferably 1/5,000 to 1/20.

When the thickness of the protective film is within the above range, a problem of warpage due to absorption of water by an acrylic resin or a difference in shrinkage rate between the acrylic resin and the polycarbonate resin does not occur advantageously, when the acrylic resin film is used.

<Method for Producing Direct Backlight Type Liquid Crystal Display Device>

A direct backlight source comprises chassis whose top surface is opened and a light source (such as a cathodoluminescent lamp). On the inner wall of the chassis, highly reflective paint, a highly reflective film material or the like is applied. A desired number of cathodoluminescent lamps may be used. A light diffusion sheet is placed in the opening of the direct backlight source, and a light ray adjusting film is placed thereon to prepare a direct backlight unit. A direct backlight type liquid crystal display device can be prepared by combining the above direct backlight unit with a liquid crystal panel.

EXAMPLES

Hereinafter, the present invention will be further described with reference to Examples.

In Examples 1 to 22 and Comparative Examples 1 to 5, the following properties were evaluated in the following manner.

(1) Total Light Transmittance: Total light transmittance was measured by use of a flat-plate test piece having a size of 50 mm×50 mm and a thickness of 2 mm and the hazemeter NDH 2000 of Nippon Denshoku Industries Co., Ltd. in accordance with JIS K-7361.

Figure 2:
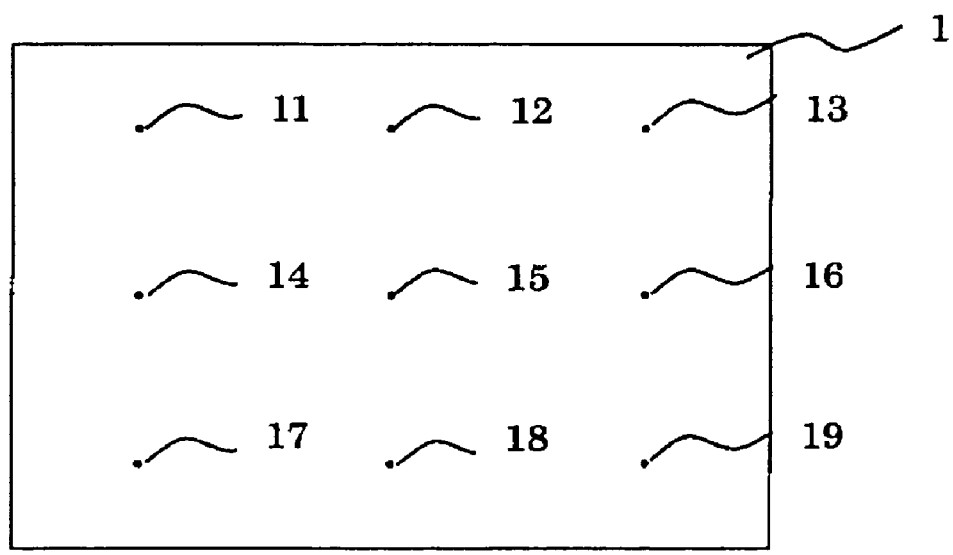
FIG. 2 is a schematic plan view of the device which evaluates average brightness in the light diffusion sheet according to the present invention.

(2) Average Brightness: A test piece having a size of 150 mm×150 mm and a thickness of 2 mm was incorporated into a direct backlight unit used in the 10.4-inch TFT color liquid crystal display device module (NL6448CC33-30W) of NEC Corporation. Brightness ($cd/m^2$) was measured at 9 points on the test piece by use of the brightness photometer BM-7 of Topcon Corporation, and the average thereof was taken as average brightness. A device for evaluating the average brightness is shown in FIGS. 1 and 2. Test pieces of Examples 20 to 22 and Comparative Example 5 were incorporated and evaluated such that the protective film faced the cold-cathode lamp.

(3) Average Brightness after Residence Test: A test piece having a size of 150 mm×150 mm and a thickness of 2 mm was molded after allowed to stay in an injection molding machine for 10 minutes. The average brightness of the test piece was measured in the same manner as in the above (2).

Figure 3:
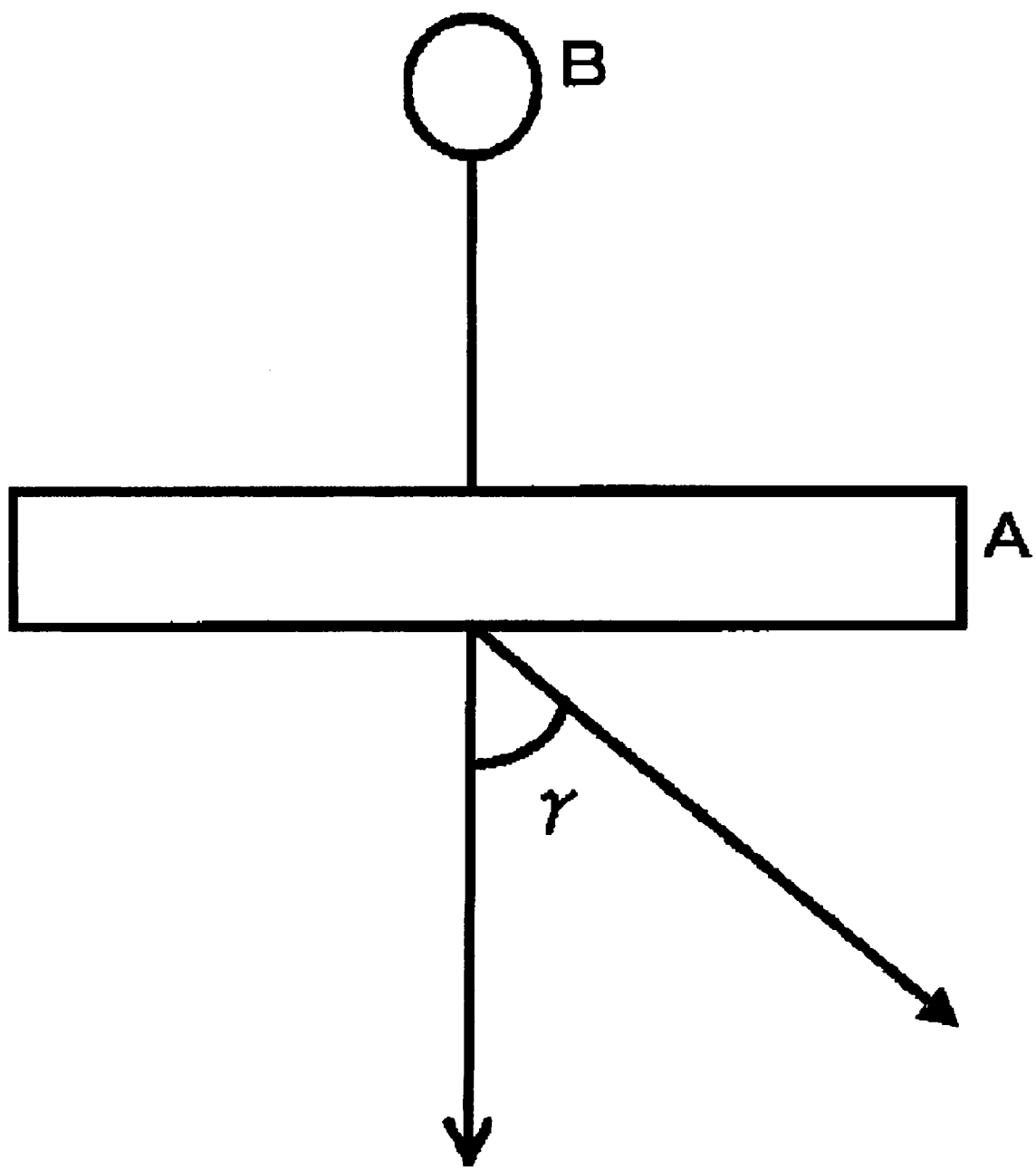
FIG. 3 is a schematic diagram illustrating a method of measuring the degree of dispersion in the present invention.

(4) Diffusibility: Diffusibility of flat-plate test piece having a size of 150 mm×150 mm and a thickness of 2 mm was measured by use of a diffusibility measuring device of Nippon Denshoku Industries Co., Ltd. A method for measuring the diffusibility is shown in FIG. 3. The diffusibility refers to the angle of γ when a transmitted light amount is 50, when a transmitted light amount at a γ of 0° when light is irradiated on a surface of the test piece vertically from above in FIG. 3 is 100.

(5) Color YI Value: The color YI value of test piece having a size of 50 mm×50 mm and a thickness of 2 mm was measured by use of a color machine (Z-1001DP of Nippon Denshoku Industries Co., Ltd.) in accordance with a C light source transmission method.

(6) Weather Resistance: The ΔYI value with respect to the initial value after irradiated at an irradiance of 90 W/m² and a temperature in a tester of 60° C. for 250 hours was measured by use of a high energy xenon weather meter of SUGA TEST INSTRUMENTS CO., LTD. as an accelerating test.

(I) Injection Molding

Examples 1 to 11 and Comparative Examples 1 and 2

In polycarbonate resin powder (refractive index: 1.59) obtained from bisphenol A and phosgene and having a viscosity average molecular weight of 18,000, the following polymeric fine particles, heat stabilizers, ultraviolet absorbers and fluorescent whitening agents were mixed in the amounts shown in Tables 1 and 2. The resulting powders were melt-kneaded and extruded at the cylinder temperatures shown in Tables 1 and 2 by a vented twin-screw extruder [KTX-30 of Kobe Steel, Ltd.] under deaeration, and the resulting strands were cut to obtain pellets. The obtained pellets were injection-molded by use of the 150t injection molding machine of Fanuc Ltd. to obtain rectangular flat-plate test pieces. Various evaluations were made on these test pieces, and the results are shown in Tables 1 and 2.

TABLE 1

| | | | Unit | Ex. 1 | Ex. 2 | Ex. 3 | Ex. 4 | Ex. 5 |
|---|---|---|---|---|---|---|---|---|
| Composition | PC | Mv = 18000 | Parts By Weight | 99.3 | 99.3 | 99.3 | 99.3 | 99.3 |
| | Polymeric Fine Particles | TOSPAL 120 | Parts By Weight | 0.7 | 0.7 | 0.7 | 0.7 | 0.7 |
| | | MBX-3S | Parts By Weight | | | | | |
| | | PARALOID EXL5136 | Parts By Weight | | | | | |
| | Heat Stabilizer | ADEKASTAB PEP-8 | Parts By Weight | 0.1 | 0.2 | 0.1 | 0.1 | 0.1 |
| | | Trimethyl Phosphate | Parts By Weight | 0.05 | 0.05 | 0.05 | 0.05 | 0.05 |
| | | Phosphonite Compound | Parts By Weight | 0.0043 | 0.0043 | 0.0043 | 0.0043 | 0.0043 |
| | | Tris(2,4-di-t-butylphenyl) phosphite | Parts By Weight | 0.0007 | 0.0007 | 0.0007 | 0.0007 | 0.0007 |
| | | IRGANOX 1010 (Comparison) | Parts By Weight | | | | | |
| | Ultraviolet Absorber | CEi-P | Parts By Weight | 0.3 | 0.3 | | | 0.3 |
| | | CHEMISORB 79 | Parts By Weight | | | 0.3 | 0.3 | |
| | Fluorescent Whitening Agent | HAKKOL PSR (Coumarin Based) | Parts By Weight | 0.003 | 0.003 | | 0.002 | |
| | | KAYALIGHT OS (Benzoxazole Based) | Parts By Weight | | | 0.02 | | 0.02 |
| Evaluation Results | | Pelletization Temperature | ° C. | 300 | 300 | 280 | 280 | 300 |
| | | Average Brightness | cd/m² | 5930 | 5940 | 5850 | 5880 | 5860 |
| | | Average Brightness after Residence Test | cd/m² | 5920 | 5940 | 5840 | 5870 | 5860 |
| | | Total Light Transmittance | % T | 54 | 54 | 54 | 54 | 54 |
| | | Diffusibility | ° | 47 | 47 | 47 | 47 | 47 |
| | Weather Resistance | Initial YI | — | 1.1 | 0.9 | 1.3 | 1.3 | 1.8 |
| | | YI after 250 hr − Initial YI (= ΔYI) | — | 4.3 | 4.4 | 3.7 | 3.9 | 3.7 |
| | | | Unit | Ex. 6 | Ex. 7 | Ex. 8 | Ex. 9 | C. Ex. 1 |
| Composition | PC | Mv = 18000 | Parts By Weight | 99.3 | 99.3 | 99.6 | 98.5 | 99.3 |
| | Polymeric Fine Particles | TOSPAL 120 | Parts By Weight | 0.7 | 0.7 | 0.4 | 1.5 | 0.7 |
| | | MBX-3S | Parts By Weight | | | | | |
| | | PARALOID EXL5136 | Parts By Weight | | | | | |
| | Heat Stabilizer | ADEKASTAB PEP-8 | Parts By Weight | 0.1 | 0.1 | 0.1 | 0.1 | 0.1 |
| | | Trimethyl Phosphate | Parts By Weight | 0.05 | 0.05 | 0.05 | 0.05 | 0.05 |
| | | Phosphonite Compound | Parts By Weight | 0.0043 | 0.0043 | 0.0043 | 0.0043 | 0.0043 |
| | | Tris(2,4-di-t-butylphenyl) phosphite | Parts By Weight | 0.0007 | 0.0007 | 0.0007 | 0.0007 | 0.0007 |
| | | IRGANOX 1010 (Comparison) | Parts By Weight | | | | | |
| | Ultraviolet Absorber | CEi-P | Parts By Weight | 0.3 | 0.4 | 0.3 | 0.3 | |
| | | CHEMISORB 79 | Parts By Weight | | | | | |
| | Fluorescent Whitening Agent | HAKKOL PSR (Coumarin Based) | Parts By Weight | 0.002 | 0.002 | 0.002 | 0.002 | |
| | | KAYALIGHT OS (Benzoxazole Based) | Parts By Weight | | | | | |
| Evaluation Results | | Pelletization Temperature | ° C. | 300 | 300 | 300 | 300 | 280 |
| | | Average Brightness | cd/m² | 5900 | 5890 | 5890 | 5860 | 5560 |
| | | Average Brightness after Residence Test | cd/m² | 5890 | 5890 | 5870 | 5840 | 5490 |
| | | Total Light Transmittance | % T | 54 | 54 | 60 | 48 | 54 |
| | | Diffusibility | ° | 47 | 47 | 36 | 47 | 47 |

TABLE 1-continued

| | | | | | | | |
|---|---|---|---|---|---|---|---|
| Weather Resistance | Initial YI | — | 2.0 | 2.1 | 1.2 | 1.5 | 6.9 |
| | YI after 250 hr − Initial YI (= ΔYI) | — | 3.8 | 4.3 | 4.0 | 4.1 | 7.5 |

Ex.: Example,
C. Ex.: Comparative Example
injection molded article: rectangular flat-plate test piece having a thickness of 2 mm

TABLE 2

| | | | Unit | Ex. 10 | Ex. 11 | C. Ex. 2 |
|---|---|---|---|---|---|---|
| Composition | PC | Mv = 18000 | Parts By Weight | 97.0 | 96.5 | 96.5 |
| | Polymeric | TOSPAL 120 | Parts By Weight | | | |
| | Fine | MBX-3S | Parts By Weight | 3.0 | | |
| | Particles | PARALOID EXL5136 | Parts By Weight | | 3.5 | 3.5 |
| | Heat | ADEKASTAB PEP-8 | Parts By Weight | 0.1 | 0.1 | |
| | Stabilizer | Trimethyl Phosphate | Parts By Weight | 0.05 | 0.05 | |
| | | Phosphonite Compound | Parts By Weight | 0.0043 | 0.0043 | |
| | | Tris(2,4-di-t-butylphenyl) phosphite | Parts By Weight | 0.0007 | 0.0007 | |
| | | IRGANOX 1010 (Comparison) | Parts By Weight | | | 0.1 |
| | Ultraviolet | CEi-P | Parts By Weight | | | |
| | Absorber | CHEMISORB 79 | Parts By Weight | 0.27 | 0.27 | 0.27 |
| | Fluorescent | HAKKOL PSR (Coumarin Based) | Parts By Weight | | | |
| | Whitening Agent | KAYALIGHT OS (Benzoxazole Based) | Parts By Weight | 0.02 | 0.02 | 0.02 |
| Evaluation Results | | Pelletization Temperature | ° C. | 280 | 280 | 280 |
| | | Average Brightness | cd/m² | 5830 | 5690 | 5430 |
| | | Average Brightness after Residence Test | cd/m² | 5820 | 5660 | 5390 |
| | | Total Light Transmittance | % T | 56 | 55 | 54 |
| | | Diffusibility | ° | 45 | 47 | 47 |
| | Weather | Initial YI | — | 2.2 | 4.4 | 4.4 |
| | Resistance | YI after 250 hr − Initial YI (= ΔYI) | — | 3.8 | 3.6 | 3.7 |

Ex.: Example,
C. Ex.: Comparative Example
injection molded article: rectangular flat-plate test piece having a thickness of 2 mm (II) Extrusion Examples 12 to 19 and Comparative Examples 3 and 4

In polycarbonate resin powder (refractive index: 1.59) obtained from bisphenol A and phosgene and having a viscosity average molecular weight of 23,900, the following polymeric fine particles, heat stabilizers, ultraviolet absorbers and fluorescent whitening agents were mixed in the amounts shown in Tables 3 and 4. The resulting powders were melt-extruded into polycarbonate resin sheets (light diffusion sheets) having a thickness of 2 mm and a width of 1,000 mm by use of a vented T-die extruder at an extruder temperature of 250 to 300° C. and a die temperature of 260 to 300° C. with a degree of vacuum in the vent portion kept at 26.6 kPa. A rectangular flat-plate test piece having a size of 50 mm×50 mm and a rectangular flat-plate test piece having a size of 150 mm×150 mm were cut out of each of the obtained sheets having a thickness of 2 mm. Various evaluations were made on these test pieces, and the results are shown in Tables 3 and 4.

TABLE 3

| | | | Unit | Ex. 12 | Ex. 13 | Ex. 14 | Ex. 15 |
|---|---|---|---|---|---|---|---|
| Composition | PC | Mv = 23900 | Parts By Weight | 99.3 | 99.3 | 99.3 | 99.3 |
| | Polymeric | TOSPAL 120 | Parts By Weight | 0.7 | 0.7 | 0.7 | 0.7 |
| | Fine | MBX-3S | Parts By Weight | | | | |
| | Particles | PARALOID EXL5136 | Parts By Weight | | | | |
| | Heat | ADEKASTAB PEP-8 | Parts By Weight | 0.1 | 0.1 | 0.1 | 0.1 |
| | Stabilizer | Trimethyl Phosphate | Parts By Weight | 0.05 | 0.05 | 0.01 | |
| | | Phosphonite Compound | Parts By Weight | | | | |
| | | Tris(2,4-di-t-butylphenyl) phosphite | Parts By Weight | | | | |
| | | IRGANOX 1010 (Comparison) | Parts By Weight | | | | |
| | Ultraviolet | CEi-P | Parts By Weight | 0.3 | | | |
| | Absorber | CHEMISORB 79 | Parts By Weight | | 0.3 | 0.3 | 0.3 |
| | Fluorescent | HAKKOL PSR (Coumarin Based) | Parts By Weight | 0.003 | | | |
| | Whitening Agent | KAYALIGHT OS (Benzoxazole Based) | Parts By Weight | | 0.02 | 0.02 | 0.02 |
| Evaluation Results | | Average Brightness | cd/m² | 5950 | 5910 | 5900 | 5880 |
| | | Total Light Transmittance | % T | 56 | 56 | 56 | 56 |
| | | Diffusibility | ° | 47 | 47 | 47 | 46 |
| | Weather | Initial YI | — | 0.8 | 0.9 | 0.9 | 1.0 |

TABLE 3-continued

| | | | | | Ex. 16 | Ex. 17 | Ex. 18 | C. Ex. 3 |
|---|---|---|---|---|---|---|---|---|
| | Resistance | YI after 250 hr − Initial YI (= ΔYI) | | — | 4.0 | 3.9 | 3.9 | 4.0 |
| | | | Unit | | Ex. 16 | Ex. 17 | Ex. 18 | C. Ex. 3 |
| Composition | PC | Mv = 23900 | Parts By Weight | | 99.3 | 99.6 | 99.6 | 99.3 |
| | Polymeric | TOSPAL 120 | Parts By Weight | | 0.7 | 0.4 | 0.4 | 0.7 |
| | Fine | MBX-3S | Parts By Weight | | | | | |
| | Particles | PARALOID EXL5136 | Parts By Weight | | | | | |
| | Heat | ADEKASTAB PEP-8 | Parts By Weight | | 0.1 | 0.1 | 0.1 | 0.1 |
| | Stabilizer | Trimethyl Phosphate | Parts By Weight | | | 0.05 | 0.01 | 0.05 |
| | | Phosphonite Compound | Parts By Weight | | 0.01 | | | |
| | | Tris(2,4-di-t-butylphenyl) phosphite | Parts By Weight | | 0.01 | | | |
| | | IRGANOX 1010 (Comparison) | Parts By Weight | | | | | |
| | Ultraviolet | CEi-P | Parts By Weight | | | 0.3 | | |
| | Absorber | CHEMISORB 79 | Parts By Weight | | 0.3 | | 0.3 | |
| | Fluorescent | HAKKOL PSR (Coumarin Based) | Parts By Weight | | | 0.002 | | |
| | Whitening Agent | KAYALIGHT OS (Benzoxazole Based) | Parts By Weight | | 0.02 | | 0.02 | |
| Evaluation Results | | Average Brightness | cd/m² | | 5890 | 5960 | 5940 | 5580 |
| | | Total Light Transmittance | % T | | 56 | 63 | 63 | 55 |
| | | Diffusibility | ° | | 47 | 37 | 36 | 47 |
| | Weather | Initial YI | — | | 1.0 | 0.8 | 1.0 | 6.5 |
| | Resistance | YI after 250 hr − Initial YI (= ΔYI) | — | | 3.9 | 3.9 | 4.0 | 8.0 |

Ex.: Example,
C. Ex.: Comparative Example
injection molded article: rectangular flat-plate test piece having a thickness of 2 mm

TABLE 4

| | | | Unit | Ex. 19 | C. Ex. 4 | Ex. 20 | Ex. 21 | C. Ex. 5 | Ex. 22 |
|---|---|---|---|---|---|---|---|---|---|
| Composition | PC | Mv = 23900 | Parts By Weight | 96.5 | 96.5 | 96.5 | 96.5 | 96.5 | 96.5 |
| | Polymeric | TOSPAL 120 | Parts By Weight | | | | | | |
| | Fine | MBX-3S | Parts By Weight | | | | | | |
| | Particles | PARALOID EXL5136 | Parts By Weight | 3.5 | 3.5 | 3.5 | 3.5 | 3.5 | 3.5 |
| | Heat | ADEKASTAB PEP-8 | Parts By Weight | 0.1 | | 0.1 | 0.1 | | 0.1 |
| | Stabilizer | Trimethyl Phosphate | Parts By Weight | 0.05 | 0.05 | 0.01 | 0.01 | | 0.01 |
| | | IRGANOX 1010 (Comparison) | Parts By Weight | | 0.1 | | | 0.01 | |
| | Ultraviolet | CEi-P | Parts By Weight | | | | | | |
| | Absorber | CHEMISORB 79 | Parts By Weight | 0.27 | 0.27 | 0.27 | 0.27 | 0.27 | 0.27 |
| | Fluorescent | HAKKOL PSR (Coumarin Based) | Parts By Weight | | | | | | |
| | Whitening Agent | KAYALIGHT OS (Benzoxazole Based) | Parts By Weight | 0.02 | 0.02 | 0.02 | 0.02 | 0.02 | 0.02 |
| Evaluation Results | | Protective Film | Kind | | | Coating A | Film B | Film B | Coating Layer C |
| | | Average Brightness | cd/m² | 5690 | 5590 | 5680 | 5680 | 5490 | 5680 |
| | | Total Light Transmittance | % T | 55 | 54 | 56 | 55 | 53 | 56 |
| | | Diffusibility | ° | 47 | 47 | 47 | 47 | 47 | 47 |
| | Weather | Initial YI | — | 4.4 | 4.7 | 4.7 | 4.7 | 4.7 | 4.7 |
| | Resistance | YI after 250 hr − Initial YI (= ΔYI) | — | 4.1 | 4.2 | 0.5 | 0.4 | 0.4 | 0.5 |

Ex.: Example,
C. Ex.: Comparative Example
injection molded article: rectangular flat-plate test piece having a thickness of 2 mm The components shown in Tables 1 to 4 are as follows.

Component B: Polymeric Fine Particles (1) Cross-linked Silicone Resin [TOSPAL 120 of GE Toshiba Silicones, weight average particle diameter: 2 μm, refractive index: 1.44]

(2) Infusible Acrylic Polymer Fine Particles [PARALOID EXL-5136 of Roam & Haas Company, weight distribution average particle diameter: 7 μm, refractive index: 1.46]

(3) Cross-linked Acrylic Particles [MBX-3S of Sekisui Plastics Co., Ltd., weight average particle diameter: 3 μm, refractive index: 1.49]

Component C-1: Phosphate Compound (Heat Stabilizer)

(1) Trimethyl Phosphate (TMP of DAIHACHI CHEMICAL INDUSTRY CO., LTD.)

Component C-2: Phosphite Compound (Heat Stabilizer)

(1) Distearyl Pentaerythritol Diphosphite (ADEKASTAB PEP-8 of Asahi Denka Kogyo Co., Ltd.)

(2) Tris(2,4-di-t-butylphenyl)phosphite (IRGAPHOS 168 of Ciba-Geigy Japan Ltd.)

(3) Tris(2,4-di-t-butylphenyl)phosphite (component C-2-c)

Component C-3: Phosphonite Compound (Heat Stabilizer)

(1) Mixture of the following components C-3-a and C-3-b and the above component C-2-c in a weight ratio of 71:15:14 (SANDSTAB P-EPQ of SAND AG)

Component C-3-a: Mixture of
tetrakis(2,4-di-t-butylphenyl)-4,4'-biphenylene diphosphonite, tetrakis(2,4-di-t-butylphenyl)-4,3'-biphenylene diphosphonite and tetrakis(2,4-di-t-butylphenyl)-3,3'-biphenylene diphosphonite in a weight ratio of 100:50:10

Component C-3-b: Mixture of bis(2,4-di-t-butylphenyl)-4-phenyl-phenyl phosphonite and bis(2,4-di-t-butylphenyl)-3-phenyl-phenyl phosphonite in a weight ratio of 5:3

Other Heat Stabilizer (Hindered Phenol Based Heat Stabilizer)

(1) Pentaerythritol tetrakis[3-(3,5-di-t-butyl-4-hydroxyphenyl)propionate] (IRGANOX 1010 of Ciba Specialty Chemical Co., Ltd.)

Component D: Ultraviolet Absorber (1) Benzoxazine-based Ultraviolet Absorber:

2,2'-m-phenylenebis(3,1-benzoxazine-4-one) (CEi-P of Takemoto oil&fat)

(2) Benzotriazole-based Ultraviolet Absorber:

2-(2'-hydroxy-5'-t-octylphenyl)benzotriazole (CHEMISORB 79 of Chemipro Kasei Kaisha, Ltd.)

Component E: Fluorescent Whitening Agent (1) Coumarin-based Fluorescent Whitening Agent (HAKKOL PSR of HAKKOL CHEMICAL CO., LTD.)

(2) Benzoxazole-based Fluorescent Whitening Agent (KAYALIGHT OS of NIPPON KAYAKU CO., LTD.)

Other Components

Bluing Agent ("Macrolex Violet B" of Bayer AG)

Example 20

In polycarbonate resin powder (refractive index: 1.59) obtained from bisphenol A and phosgene and having a viscosity average molecular weight of 23,900, polymeric fine particles, heat stabilizers, an ultraviolet absorber and a fluorescent whitening agent were mixed in the amounts shown in Table 4. The resulting powder was melt-extruded into a polycarbonate resin sheet (light diffusion sheet) having a thickness of 2 mm and a width of 1,000 mm by use of a vented T-die extruder at an extruder temperature of 250 to 300° C. and a die temperature of 260 to 300° C. with a degree of vacuum in the vent portion kept at 26.6 kPa. An acrylic resin coating A prepared in accordance with the following composition (solid concentration of coating: 14 wt %) was applied to a surface of the obtained sheet by flow coating. After left to stand at room temperature for 25 minutes, the coated sheet was dried by heating for 40 minutes in a hot air circulating dryer of 120° C. to give a transparent coated polycarbonate resin light diffusion sheet which was coated with an acryl cured layer (thickness: 4 µm) containing an ultraviolet absorber. The obtained transparent coated polycarbonate resin light diffusion sheet showed an amount of the ultraviolet absorber per unit area (1 m$^2$) of the protective film of 0.67 g/m$^2$ and a {thickness of the protective film (mm)/thickness of the light diffusion sheet (mm)} of 1/500. A rectangular flat-plate test piece having a size of 50 mm×50 mm and a rectangular flat-plate test piece having a size of 150 mm×150 mm were cut out of the obtained light diffusion sheet. Various evaluations were made on these test pieces, and the results are shown in Table 4.

Composition of Acrylic Resin Coating A (a) Cured Resin: polymethyl methacrylate 11.5 parts by weight (b) Ultraviolet Absorber: 2-(2'-hydroxy-5'-t-octylphenyl)benzotriazole 2.5 parts by weight (c) Solvent: isobutyl alcohol 28 parts by weight (d) Solvent: ethylene glycol monoethyl ether 28 parts by weight (e) Solvent: 4-hydroxy-4-methyl-2-pentanone 30 parts by weight Example 21 and Comparative Example 5

In polycarbonate resin powder (refractive index: 1.59) obtained from bisphenol A and phosgene and having a viscosity average molecular weight of 23,900, polymeric fine particles, heat stabilizers, an ultraviolet absorber and a fluorescent whitening agent were mixed in the amounts shown in Table 4. The resulting powder was melt-extruded into a polycarbonate resin sheet (light diffusion sheet) having a thickness of 2 mm and a width of 1,000 mm by use of a vented T-die extruder at an extruder temperature of 250 to 300° C. and a die temperature of 260 to 300° C. with a degree of vacuum in the vent portion kept at 26.6 kPa. In melt-extrusion of the polycarbonate resin sheet, the sheet was held between two pairs of rolls each having a diameter of 300 mm while the surface temperature of the sheet was 140° C. so as to apply a pressure of 0.05 MPa to the sheet, and a polymethacrylic ester based film B [ACRYPRENE HBS006 of Mitsubishi Rayon Co., Ltd.; a benzotriazole-based ultraviolet absorber was used in an amount of about 1 part by weight based on 100 parts by weight of the acrylic resin] having a thickness of 50 µm and a width of 1,000 mm was inserted and thermocompression-bonded to a surface of the sheet. The obtained light diffusion sheet with the protective film showed an amount of the ultraviolet absorber per unit area (1 m$^2$) of the protective film of 0.47 g/m$^2$ and a {thickness of the protective film (mm)/thickness of the light diffusion sheet (mm)} of 1/40. A rectangular flat-plate test piece having a size of 50 mm×50 mm and a rectangular flat-plate test piece having a size of 150 mm×150 mm were cut out of the obtained light diffusion sheet. Various evaluations were made on these test pieces, and the results are shown in Table 4.

Example 22

In polycarbonate resin powder (refractive index: 1.59) obtained from bisphenol A and phosgene and having a viscosity average molecular weight of 23,900, polymeric fine particles, heat stabilizers, an ultraviolet absorber and a fluorescent whitening agent were mixed in the amounts shown in Table 4. The resulting powder was fed into an extruder having a screw diameter of 120 mm and molten at 250 to 300° C. with a degree of vacuum in the vent portion kept at 26.6 kPa. Meanwhile, to an auxiliary extruder having a screw diameter of 50 mm, an ultraviolet-absorber-containing polycarbonate resin composition prepared by mixing 100 parts by weight of polycarbonate resin obtained from bisphenol A and phosgene and having a viscosity average molecular weight of 24,300 with 3 parts by weight of 2-(4,6-diphenyl-1,3,5-triazine-2-yl)-5-(hexyl)oxy-phenol (product of Ciba-Geigy Japan Ltd., trade name: TINUVIN 1577FF) as an ultraviolet absorber and extruding and granulating the mixture was fed, and the resin composition was molten at an extruder temperature of 250 to 300° C. A laminate (light diffusion sheet having a protective film) having a width of 1,000 mm was co-extruded through a feed block and a T die with the thickness of ultraviolet-absorber-containing resin coating layer C controlled to 50 μm and the thickness of polycarbonate resin sheet controlled to 2 mm. The obtained light diffusion sheet with the protective film showed an amount of the ultraviolet absorber per unit area (1 m$^2$) of the protective film of 1.8 g/m$^2$ and a {thickness of the protective film (mm)/thickness of the light diffusion sheet (mm)} of 1/40. A rectangular flat-plate test piece having a size of 50 mm×50 mm and a rectangular flat-plate test piece having a size of 150 mm×150 mm were cut out of the obtained light diffusion sheet. Various evaluations were made on these test pieces, and the results are shown in Table 4.

Example of Direct Backlight Type Liquid Crystal Display Device

Example 23 and Comparative Example 6

The test pieces obtained in Example 21 and Comparative Example 5 were incorporated in 15-inch color liquid crystal display device modules (A150X1) of CHI MEI OPTOELECTRONICS CORP. as light diffusion sheets such that the protective film faced a cold cathode lamp, and the liquid crystal display devices were observed visually. The liquid crystal display device incorporating the test piece obtained in Example 21 showed a brightness of 360 cd/m$^2$, while the liquid crystal display device incorporating the test piece obtained in Comparative Example 5 showed a brightness of 330 cd/m$^2$. The liquid crystal display device incorporating the test piece obtained in Example 21 had a brighter screen than the liquid crystal display device incorporating the test piece obtained in Comparative Example 5.

EFFECT OF THE INVENTION

The light diffusion sheet and direct backlight type liquid crystal display device of the present invention have high brightness and high light diffusibility and retain excellent color even when exposed to heat and light.

POSSIBILITY OF INDUSTRIAL APPLICATION

The direct backlight type liquid crystal display device of the present invention can be suitably used for liquid crystal televisions, large liquid crystal display devices of 15 to 39 inches and the like.

The invention claimed is:

1. A direct backlight type liquid crystal device comprising:
   a backlight source,
   a light diffusion sheet which has a protective film on a surface thereof which faces the backlight source or on both surfaces thereof as desired,
   a light ray adjusting film, and
   a liquid crystal panel,
   wherein
   the light diffusion sheet is formed from a composition comprising:
   (A) 80 to 99.995 wt % of aromatic polycarbonate resin (component A), and
   (B) 0.005 to 20 wt % of polymeric fine particles (component B) having an average particle diameter of 0.01 to 50 μm,
   and
   (C) 0.001 to 5 parts by weight of at least one heat stabilizer (component C) selected from the group consisting of a phosphate compound (component C-1), a phosphite compound (component C-2) and a phosphonite compound (component C-3), and
   (D) 0 to 0.5 parts by weight of ultraviolet absorber (component D), and
   (E) 0.0001 to 3 parts by weight of fluorescent whitening agent (component E), and
   (F) less than 0.001 parts by weight of hindered phenol compound (component F),
   based on 100 parts by weight of the total of the components A and B,
   and the light diffusion sheet has a thickness of 0.5 to 10 mm,
   wherein the protective film is an organic polymer film containing 0.1 to 50 wt % of ultraviolet absorber (component D$^p$) and having a thickness of 0.1 to 500 μm, and the organic polymer is an acrylic resin or a polycarbonate resin.

2. The device of claim 1, wherein the average particle diameter of the polymeric fine particles (component B) is 0.1 to 10 μm.

3. The device of claim 1, wherein the absolute value of the difference between the refractive index of the polymeric fine particles (component B) and the refractive index of the aromatic polycarbonate resin (component A) is 0.02 to 0.3.

4. The device of claim 1, wherein the polymeric fine particles (component B) are cross-linked silicone particles or cross-linked acryl particles.

5. The device of claim 1, wherein the heat stabilizer (component C) is at least one compound selected from the group consisting of trialkyl phosphate (component C-1) and a pentaerythritol diphosphite compound (component C-2) represented by the following general formula (2-1):

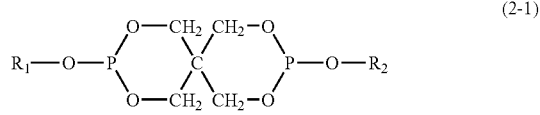

(2-1)

(wherein R$_1$ and R$_2$ each represent a hydrogen atom, an alkyl group having 1 to 20 carbon atoms, a substituted or unsubstituted aryl group having 6 to 30 carbon atoms, a substituted or unsubstituted aralkyl group having 7 to 30 carbon atoms, a substituted or unsubstituted cycloalkyl group having 4 to 20 carbon atoms or a 2-(4-oxyphenyl)propyl substituted aryl group having 15 to 25 carbon atoms).

6. The device of claim 1, wherein the heat stabilizer (component C) is trimethyl phosphate (component C-1).

7. The device of claim 1, wherein the heat stabilizer (component C) is distearyl pentaerythritol diphosphite (component C-2).

8. The device of claim 1, wherein the heat stabilizer (component C) comprises trimethyl phosphate (component C-1) and distearyl pentaerythritol diphosphite (component C-2).

9. The device of claim 1, wherein the heat stabilizer (component C) comprises distearyl pentaerythritol diphosphite (component C-2), a phosphite compound (component C-2) represented by the following general formula (2-2):

(2-2)

(wherein Ar²s may be the same as or different from one another and represent a $C_8$ to $C_{20}$ aryl group substituted with 2 to 4 alkyl groups), and a phosphonite compound (component C-3) represented by the following general formula (3-1):

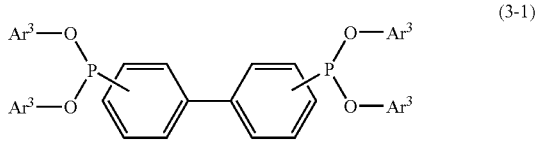

(3-1)

(wherein Ar³s may be the same as or different from one another and represent a $C_6$ to $C_{20}$ aryl group which is unsubstituted or substituted with an alkyl group).

10. The device of claim 1, wherein the heat stabilizer (component C) comprises a phosphite compound (component C-2) represented by the following general formula (2-2):

(2-2)

(wherein Ar²s may be the same as or different from one another and represent a $C_8$ to $C_{20}$ aryl group substituted with 2 to 4 alkyl groups), and a phosphonite compound (component C-3) represented by the following general formula (3-1):

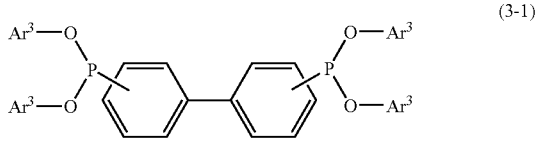

(3-1)

(wherein Ar³s may be the same as or different from one another and represent a $C_6$ to $C_{20}$ aryl group which is unsubstituted or substituted with an alkyl group).

11. The device of claim 1, wherein the ultraviolet absorber (component D) is at least one ultraviolet absorber selected from the group consisting of a benzophenone based ultraviolet absorber, a benzotriazole based ultraviolet absorber and a benzoxazine based ultraviolet absorber.

12. The device of claim 1, wherein the organic polymer constituting the protective film is an acrylic resin, a polycarbonate resin, a polyethylene rein or a polyester resin.

13. The device of claim 1, wherein the ultraviolet absorber (component $D^P$) in the protective film is at least one ultraviolet absorber selected from the group consisting of a benzophenone based ultraviolet absorber, a benzotriazole based ultraviolet absorber and a benzoxazine based ultraviolet absorber.

14. The device of claim 1, wherein the fluorescent whitening agent (component E) is a benzoxazole based fluorescent whitening agent and/or a coumarin based fluorescent whitening agent.

15. The device of claim 1, wherein the light diffusion sheet is formed from a composition comprising 0.01 to 0.5 parts by weight of ultraviolet absorber (component D) based on 100 parts by weight of the total of the components A and B.

16. A light diffusion sheet which has a protective film for a direct backlight, wherein the light diffusion sheet is formed from a composition comprising:

(A) 80 to 99.995 wt % of aromatic polycarbonate resin (component A), and (B) 0.005 to 20 wt % of polymeric fine particles (component B) having an average particle diameter of 0.01 to 50 μm, and (C) 0.001 to 5 parts by weight of at least one heat stabilizer (component C) selected from the group consisting of a phosphate compound (component C-1), a phosphite compound (component C-2) and a phosphonite compound (component C-3), and (D) 0 to 0.5 parts by weight of ultraviolet absorber (component D), and (E) 0.0001 to 3 parts by weight of fluorescent whitening agent (component E), and (F) less than 0.001 parts by weight of hindered phenol compound (component F), based on 100 parts by weight of the total of the components A and B, and the light diffusion sheet has a thickness of 0.5 to 10 mm, wherein the protective film is an organic polymer film containing 0.1 to 50 wt % of ultraviolet absorber (component $D^P$) and having a thickness of 0.1 to 500 μm, and the organic polymer is an acrylic resin or a polycarbonate resin.

17. The light diffusion sheet of claim 16, wherein the average particle diameter of the polymeric fine particles (component B) is 0.1 to 10 μm.

18. The light diffusion sheet of claim 16, wherein the absolute value of the difference between the refractive index of the polymeric fine particles (component B) and the refractive index of the aromatic polycarbonate resin (component A) is 0.02 to 0.3.

19. The light diffusion sheet of claim 16, wherein the polymeric fine particles (component B) are cross-linked silicone particles or cross-linked acryl particles.

20. The light diffusion sheet of claim 16, wherein the heat stabilizer (component C) is at least one compound selected from the group consisting of trialkyl phosphate (component C-1) and a pentaerythritol diphosphite compound (component C-2) represented by the following general formula (2-1):

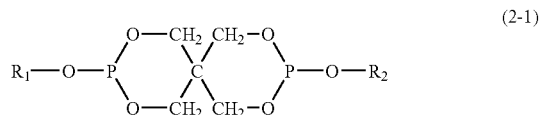

(2-1)

(wherein $R_1$ and $R_2$ each, represent a hydrogen atom, an alkyl group having 1 to 20 carbon atoms, a substituted or unsubstituted aryl group having 6 to 30 carbon atoms, a substituted or unsubstituted aralkyl group having 7 to 30 carbon atoms, a substituted or unsubstituted cycloalkyl group having 4 to 20 carbon atoms or a 2-(4-oxyphenyl)propyl substituted aryl group having 15 to 25 carbon atoms).

21. The light diffusion sheet of claim 16, wherein the heat stabilizer (component C) is trimethyl phosphate (component C-1).

22. The light diffusion sheet of claim 16, wherein the heat stabilizer (component C) is distearyl pentaerythritol diphosphite (component C-2).

23. The light diffusion sheet of claim 16, wherein the heat stabilizer (component C) comprises trimethyl phosphate (component C-1) and distearyl pentaerythritol diphosphite (component C-2).

24. The light diffusion sheet of claim 16, wherein the heat stabilizer (component C) comprises distearyl pentaerythritol diphosphite (component C-2), a phosphite compound (component C-2) represented by the following general formula (2-2):

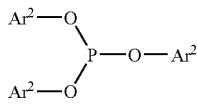

(2-2)

(wherein $Ar^2$s may be the same as or different from one another and represent a $C_8$ to $C_{20}$ aryl group substituted with 2 to 4 alkyl groups), and a phosphonite compound (component C-3) represented by the following general formula (3-1):

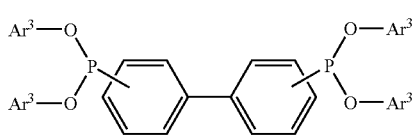

(3-1)

(wherein $Ar^3$s may be the same as or different from one another and represent a $C_6$ to $C_{20}$ aryl group which is unsubstituted or substituted with an alkyl group).

25. The light diffusion sheet of claim 16, wherein the heat stabilizer (component C) comprises a phosphite compound (component C-2) represented by the following general formula (2-2):

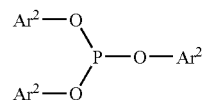

(2-2)

(wherein $Ar^2$s may be the same as or different from one another and represent a $C_8$ to $C_{20}$ aryl group substituted with 2 to 4 alkyl groups), and a phosphonite compound (component C-3) represented by the following general formula (3-1):

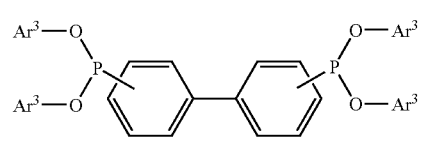

(3-1)

(wherein $Ar^3$s may be the same as or different from one another and represent a $C_6$ to $C_{20}$ aryl group which is unsubstituted or substituted with an alkyl group).

26. The light diffusion sheet of claim 16, wherein the ultraviolet absorber (component D) is at least one ultraviolet absorber selected from the group consisting of a benzophenone based ultraviolet absorber, a benzotriazole based ultraviolet absorber and a benzoxazine based ultraviolet absorber.

27. The light diffusion sheet of claim 16, wherein the fluorescent whitening agent (component E) is a benzoxazole based fluorescent whitening agent and/or a coumarin based fluorescent whitening agent.

28. The light diffusion sheet of claim 16, wherein the sheet is formed from a composition comprising 0.01 to 0.5 parts by weight of ultraviolet absorber (component D) based on 100 parts by weight of the total of the components A and B.

* * * * *